(12) United States Patent
Ophaug

(10) Patent No.: US 12,492,762 B2
(45) Date of Patent: Dec. 9, 2025

(54) CONNECTOR AND METHOD FOR CONNECTING COMPOSITE PIPELINES

(71) Applicant: Purapipe USA, Inc., Boca Raton, FL (US)

(72) Inventor: Arvid Ophaug, Boca Raton, FL (US)

(73) Assignee: PURAPIPE USA, INC., Boca Raton, FL (US)

( * ) Notice: Subject to any disclaimer, the term of this patent is extended or adjusted under 35 U.S.C. 154(b) by 335 days.

(21) Appl. No.: 17/944,318

(22) Filed: Sep. 14, 2022

(65) Prior Publication Data
US 2024/0084936 A1 Mar. 14, 2024

(51) Int. Cl.
F16L 23/00 (2006.01)
F16L 23/036 (2006.01)
F16L 37/23 (2006.01)

(52) U.S. Cl.
CPC .......... F16L 23/006 (2013.01); F16L 23/036 (2013.01); F16L 37/23 (2013.01)

(58) Field of Classification Search
CPC ....... F16L 33/01; F16L 23/02; F16L 2201/30; F16L 37/22; F16L 37/23
See application file for complete search history.

(56) References Cited

U.S. PATENT DOCUMENTS

| | | | |
|---|---|---|---|
| 2,470,256 A | 5/1949 | Mcilroy | |
| 2,854,259 A * | 9/1958 | Clark | F16L 37/23 137/614.03 |
| 3,064,999 A * | 11/1962 | Melsom | F16L 33/01 285/222.1 |
| 3,301,272 A * | 1/1967 | Pettyjohn | F16L 37/36 137/614.06 |
| 3,346,276 A * | 10/1967 | Snyder, Jr. | F16L 37/23 277/910 |
| 3,779,586 A * | 12/1973 | Rossiter | F16L 37/23 285/308 |
| 3,964,771 A | 6/1976 | Baudoin | |
| 4,223,919 A * | 9/1980 | Kurachi | F16L 19/065 285/8 |
| 4,957,313 A * | 9/1990 | MacIntyre | E21B 19/10 294/102.2 |
| 5,653,480 A | 8/1997 | Mine | |
| 5,967,477 A | 10/1999 | Walmsley | |

(Continued)

OTHER PUBLICATIONS

International Search Report and Written Opinion mailed in corresponding PCT/US23/32304 on Jan. 5, 2024 (13 pages).

*Primary Examiner* — Zachary T Dragicevich
*Assistant Examiner* — Alexander T Rufrano
(74) *Attorney, Agent, or Firm* — Wissing Miller LLP

(57) ABSTRACT

A flange unit for use in connecting composite pipelines and a method of said flange unit installation. The flange unit comprising: a connector flange, an elongate tubular member extending from the connector flange, the elongate tubular member comprising at least two locking apertures, at least two locking studs, and a second tubular part configured to surround the elongate tubular member, wherein the second tubular part is configured to slide axially with respect to the elongate tubular member by a predetermined distance, to force the at least two locking studs into the at least two locking apertures, and radially inwards, to create a clamping force between the flange unit and a pipeline that the flange unit is to be installed upon.

13 Claims, 20 Drawing Sheets

(56) References Cited

U.S. PATENT DOCUMENTS

| | | | |
|---|---|---|---|
| 6,837,064 B2 * | 1/2005 | Knowles | F16L 37/23 62/299 |
| 7,850,190 B2 * | 12/2010 | Ruckle | F16L 37/23 280/421 |
| 8,646,811 B1 * | 2/2014 | Chang | F16L 37/23 285/1 |
| 9,285,063 B2 | 3/2016 | Jones | |
| 2020/0309299 A1 | 10/2020 | Williams | |

* cited by examiner

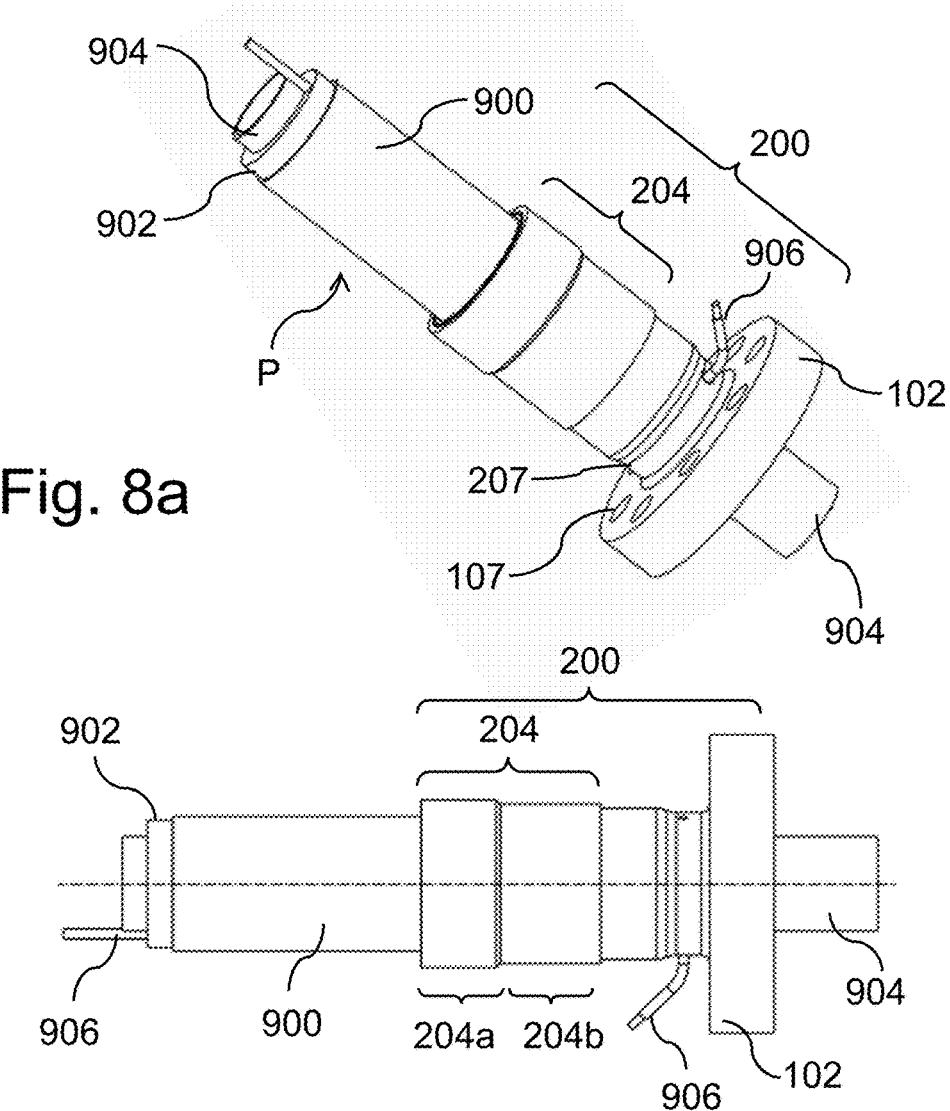
Fig. 8a
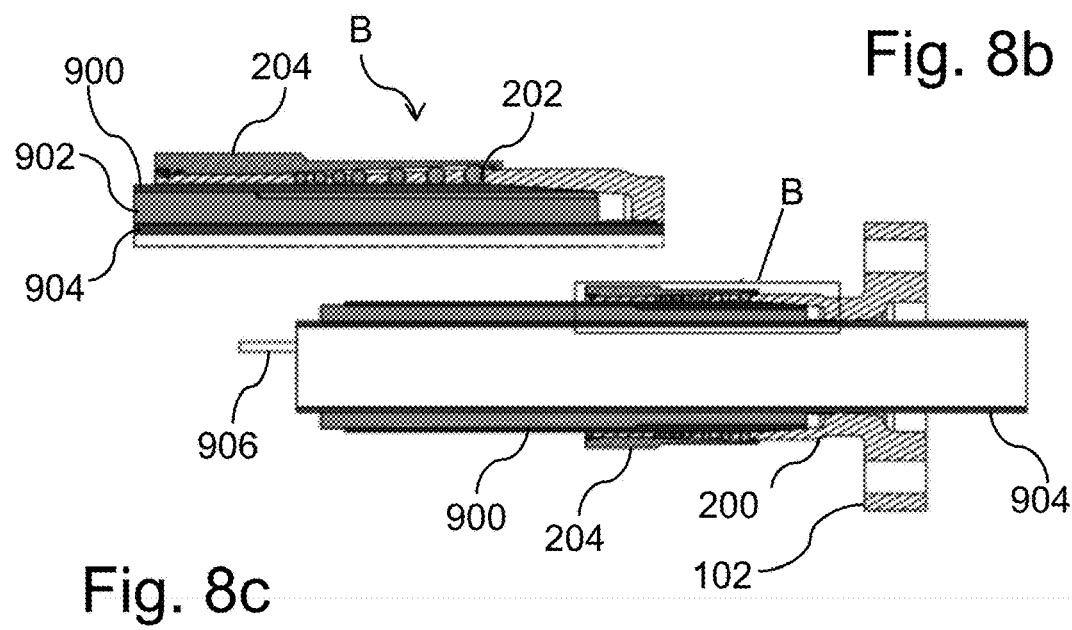
Fig. 8b
Fig. 8c

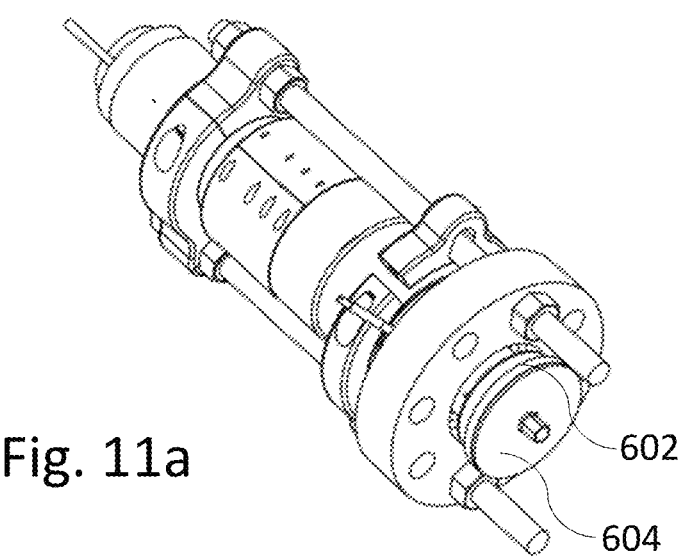
Fig. 11a
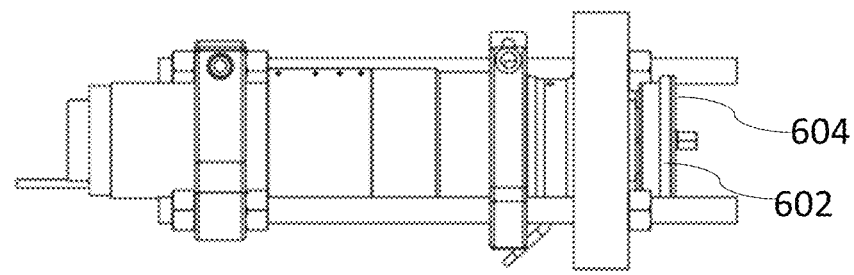
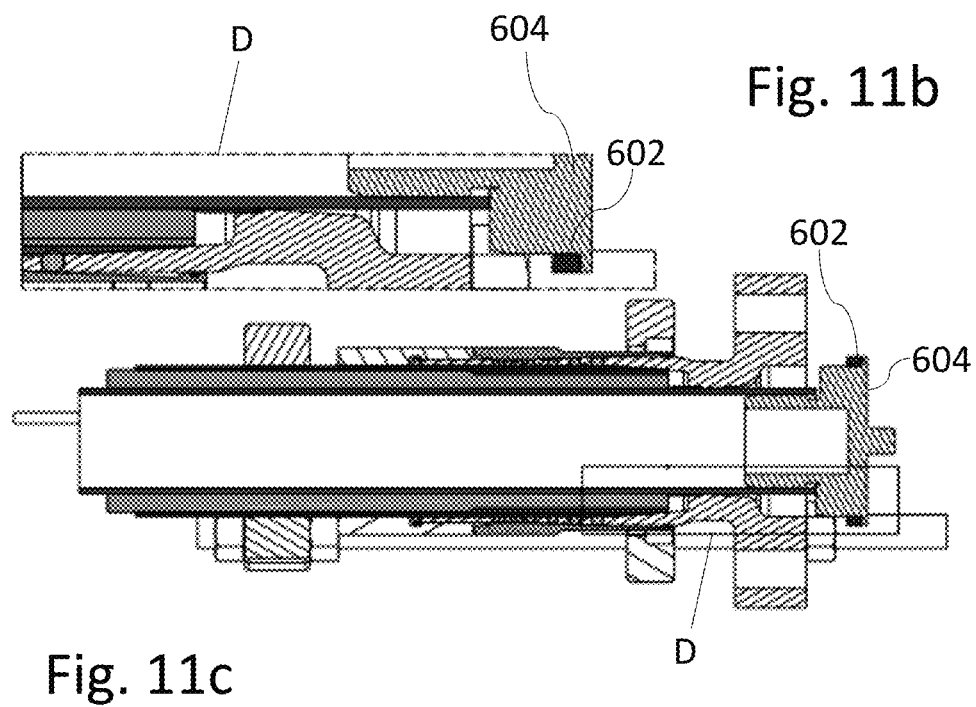
Fig. 11b
Fig. 11c

CONNECTOR AND METHOD FOR CONNECTING COMPOSITE PIPELINES

BACKGROUND

A type of pipeline for carrying fluids can be a composite pipeline. Composite pipelines have at least one inner-pipe layer, at least one outer-pipe layer and at least one middle layer (an insulation layer between the inner-pipe layer and outer-pipe layer). It is desirable to have an apparatus to reliable connect sections of composite pipeline with other sections of pipeline, for example other non-composite pipeline such as traditional metal pipes, or another composite pipeline. It is also desirable to monitor any potential leakage at the connection point.

Thus, it is an object of the invention to provide a connector, a kit of parts and a method for connecting composite pipelines.

SUMMARY

According to a first aspect of the invention there is provided a flange unit for use in connecting composite pipelines comprising: a connector flange; an elongate tubular member extending from the connector flange, the elongate tubular member comprising at least two locking apertures; at least two locking studs; and a second tubular part configured to surround the elongate tubular member; wherein the second tubular part is configured to slide axially with respect to the elongate tubular member by a predetermined distance, to force the at least two locking studs into the at least two locking apertures, and radially inwards, to create a clamping force between the flange unit and a pipeline that the flange unit is to be installed upon.

The at least two locking studs may be a series of locking bearings, and the at least two locking apertures may be a series of locking apertures, wherein the series of locking bearings are configured to sit in the series of locking apertures, and the second tubular part is slidable over the series of locking bearings to force the series of locking bearings into the series of locking apertures, and radially inwards, to create the clamping force.

The connector flange may be configured to withstand a pressure of 2000 pounds per square inch.

The series of locking bearings may be substantially spherical, and the series of locking apertures may be substantially circular and complementary to the series of locking bearings.

The series of locking bearings may be progressively larger from a first end of the flange unit to a second end of the flange unit, the second end of the flange unit closer to the connector flange than the first end of the flange unit.

The second tubular part may comprise a first part and a second part, wherein the second part of the second tubular part is angled with respect to an external surface of the elongate member to accommodate the increasing size of the locking bearings when the flange unit is in a first unlocked position.

An internal surface of the first part of the second tubular part may be contiguous with an external surface of the elongate tubular member.

The elongate tubular member may further comprise a cable aperture for feeding through an exposed cable portion of a pipeline to be connected.

The elongate tubular member may have a tapered section proximate to the connector flange, the tapered section of the elongate tubular member configured to contiguously surround an inner part of a composite pipe and a non-tapered section of the elongate tubular member configured to contiguously surround an outer part of said composite pipe.

The connector flange may further comprise bolt apertures for accommodating a bolt to connect the connector flange to an interface flange.

According to a second aspect of the invention there is provided a connector for connecting composite pipelines comprising the flange unit the first aspect of the invention, an outer pipe support tube, and an inner pipe support tube.

The connector may further comprise an anti-vibration sleeve.

The connector may further comprise an inner pipe element configured to sit within a well of the connector flange, the inner pipe element comprising an inner pipe seal and/or a leak detection area.

The connector may further comprise an interface flange.

The connector may further comprise a junction box.

The connector may further comprise a leak detection monitoring sensor.

According to a third aspect of the invention there is provided an installation apparatus for installing a connector on a composite pipe comprising an outer pipe layer remover, and a flange unit attachment device.

The installation apparatus may be adapted for installing the connector of the second aspect.

The flange unit attachment device may comprise a first clamp for clamping to the second tubular part and an outer-pipe clamp.

The flange unit attachment device may further comprise one or both of an inner-pipe cutting tool and an inner-pipe coning tool.

According to a fourth aspect of the invention there is provided a kit of part comprising the connector of the second aspect, and the installation apparatus of the third aspect.

According to a fifth aspect of the invention there is provided a method for connecting composite pipelines comprising cutting the composite pipeline, cutting and removing a portion of an insulating layer of the composite pipe, cutting and removing a portion of an outer-pipe layer of the composite pipe,
  installing a flange unit comprising a connector flange, and cutting an inner pipe layer to a predetermined length.
  Cutting and removing a portion of an insulating layer of the composite pipe may comprise excavating a portion of an insulation layer between a portion of remaining outer-pipe layer and a portion of remaining inner-pipe layer, and
  installing an outer-pipe support within a cavity between the portion of remaining outer-pipe layer and the portion of remaining inner-pipe layer, the cavity created by the insulation layer excavation.

The method may further comprise inserting an inner-pipe seal cone to seal the inner-pipe layer between the inner-pipe seal cone and the flange unit.

The method may further comprise coning the inner pipe layer after installing the flange unit.

The method may further comprise connecting an interface flange to the connector flange.

The method may further comprise connecting leak detection equipment.

Installing the flange unit may comprises clamping a first clamp to the second tubular part, axially, slidably securing the first clamp with respect to the flange unit such that the first clamp and the second tubular part are axially slidable by a predetermined distance, clamping an outer-pipe section of the pipeline with a second clamp, fixedly securing the second clamp with respect to the flange unit; sliding the first clamp axially along the flange unit a predetermined distance to slide the second tubular part along the flange unit such that the second tubular part aligns with a series of locking bearings, pushing the locking bearings into respective locking apertures and against an outer pipeline beneath to create a securing force between the flange unit and said outer pipe.

BRIEF DESCRIPTION OF THE DRAWINGS

FIG. 6b shows the example pipeline section and the first part of the example installation apparatus of FIG. 4a;

FIG. 7b shows a mounting of an outer-pipe support and an inner-pipe support onto the pipeline section of FIG. 7a;

FIG. 8a is a perspective view of the pipeline section of FIG. 7a with a flange unit mounted thereto;

FIG. 8b is a side on view of the pipeline section with mounted flange unit of FIG. 8a;

FIG. 8c is a cross-sectional view of the pipeline section with mounted flange unit of FIG. 8a;

FIG. 9b is a side on view of the pipeline section with mounted installation apparatus part of FIG. 9a;

FIG. 9c is a cross-sectional view of the pipeline section with mounted installation apparatus part of FIG. 9a;

FIG. 10b shows a side on view of FIG. 10a;

FIG. 11a is a perspective view of the pipeline section of FIG. 10a with an inserted inner-pipe cutting tool;

FIG. 11b shows a side on view of FIG. 11a;

FIG. 11c shows a cross-sectional view of FIG. 11a;

FIG. 12b is a side on view of FIG. 12a;

FIG. 12c is a cross-sectional view of FIG. 12a;

FIG. 13b is a side on view of FIG. 13a;

FIG. 13c is a cross-sectional view of FIG. 13a;

FIG. 14b is a side on view of FIG. 14a;

FIG. 14c is a cross-sectional view of FIG. 14a;

FIG. 15b is a side on view of FIG. 15a;

FIG. 15c is a cross-sectional view of FIG. 15a;

FIG. 16b is a side on view of FIG. 16a;

FIG. 16c is a cross-sectional view of FIG. 16a;

FIG. 17b is a cross-sectional view of FIG. 17a;

DETAILED DESCRIPTION

Figure 1A:
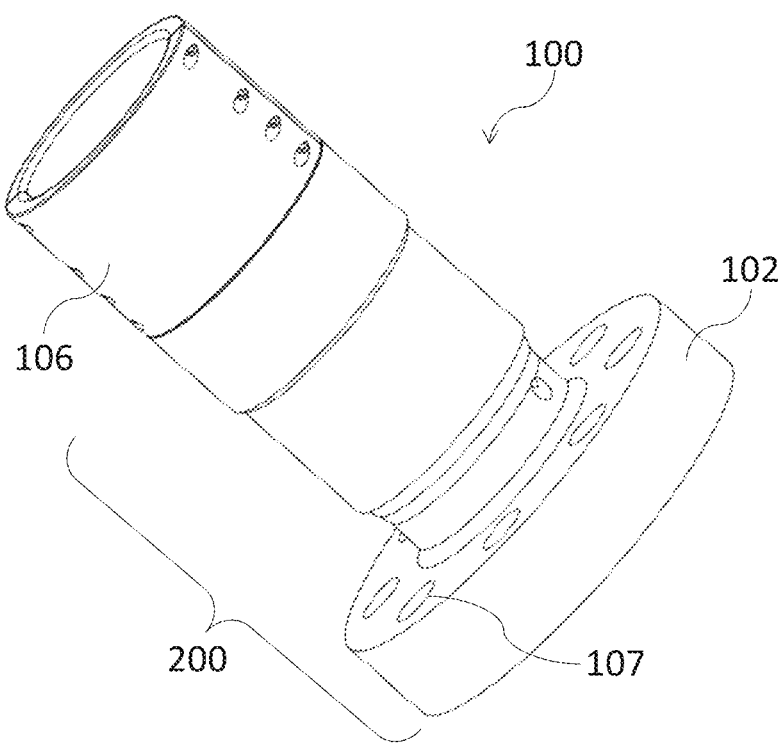
FIG. 1a is a perspective view of an example connector of the invention.
Figure 1B:
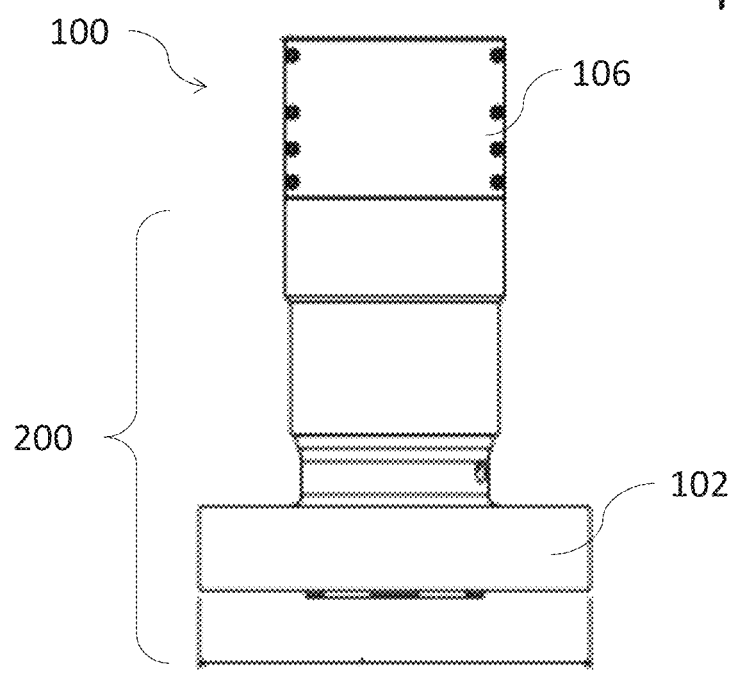
FIG. 1b is a front on view of the example connector of FIG. 1.
Figure 2:
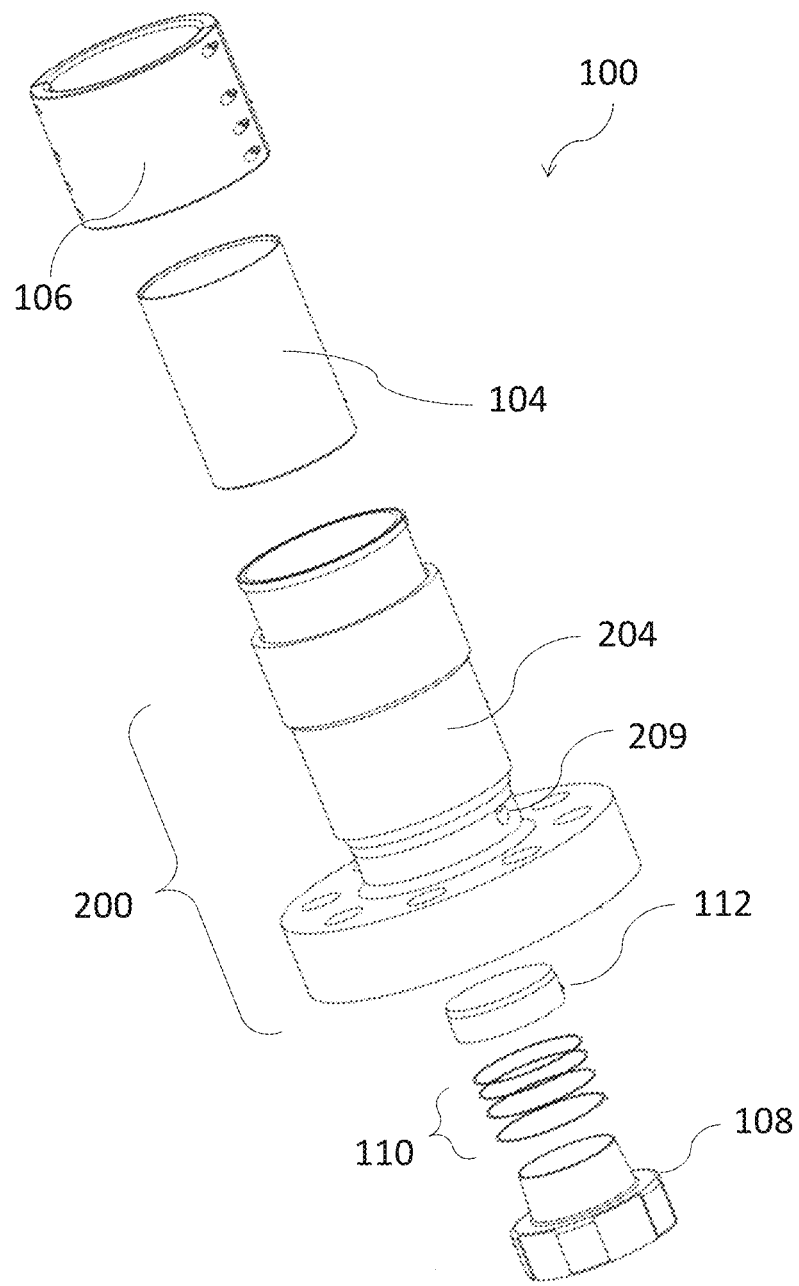
FIG. 2 is an exploded view of the example connector of FIG. 1 and FIG. 2.

FIGS. 1a and 1b show an example connector 100 for connecting a composite pipeline to other pipelines, both composite and non-composite. The connector 100 has a connector flange 102, a flange unit part 200 and an anti-vibration sleeve 106. The connector flange 102 has connector flange apertures 107. FIG. 2 shows an exploded view of the example connector 100. FIG. 2 further shows inner-pipe support tube 112, outer-pipe support tube 104, secondary barrier seal and length compensating o-rings 110, and an inner-pipe sealing cone 108. The flange unit part 200 comprises a cable aperture 209.

Figure 3:
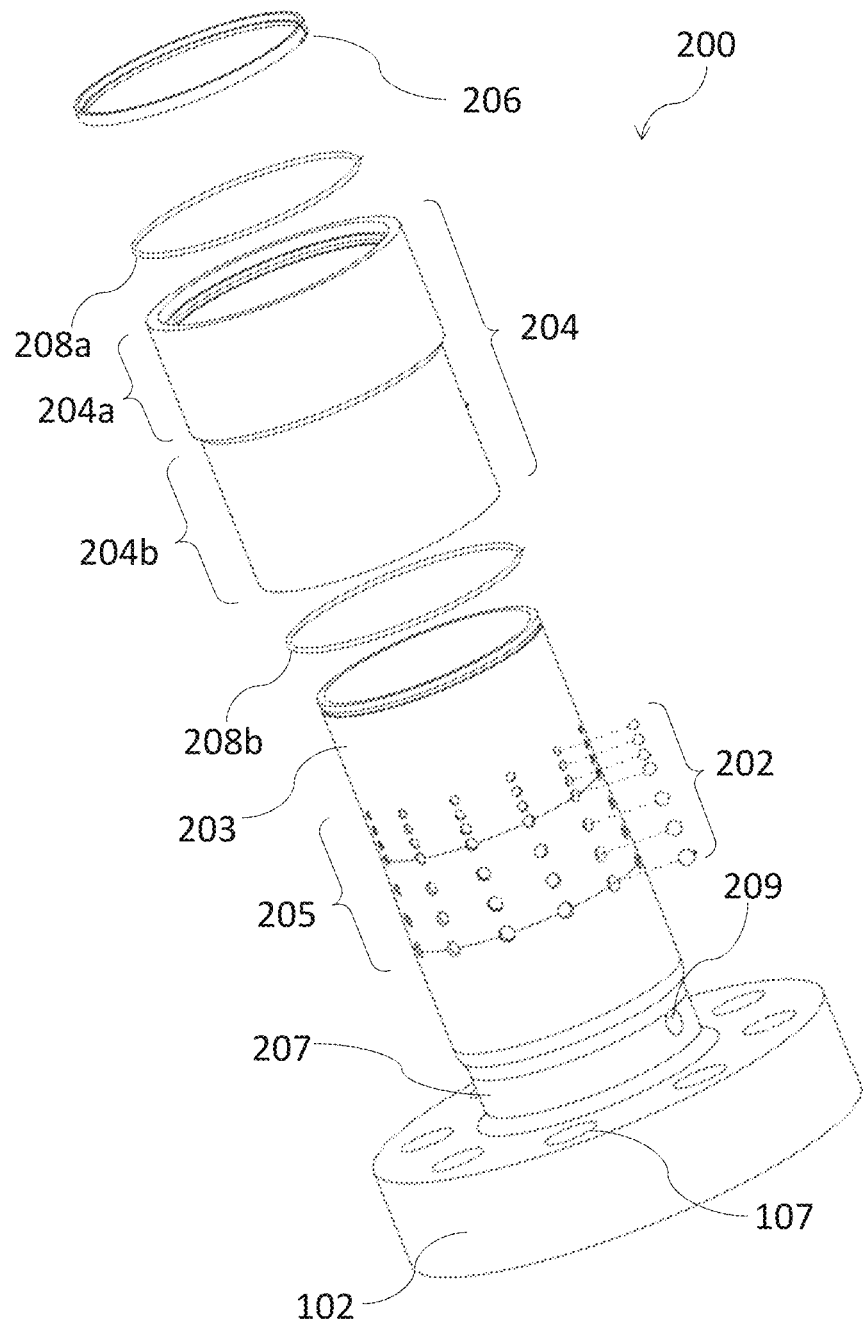
FIG. 3 is an exploded view of an example flange unit of the invention.

FIG. 3 is an exploded view of an example flange unit part 200 of the connector 100. Flange unit part 200 has the connector flange 102, an elongate tubular member 203 extending from, and integrated with, the connector flange 102, a series of locking studs in the form of a series of locking bearings 202, a second tubular part (pull-up cone) 204, and a lock ring 206. In another example, the series of locking studs are two or more protrusion which may or may not be integral with an internal surface of the second tubular part 204. The elongate tubular member 203 comprises a series of locking apertures 205 to accommodate the series of locking bearings 202. The series of locking apertures are two or more apertures and are complimentary to the series of locking studs. Also shown are sealing rings 208a and 208b. The elongate tubular member 203 has a tapered part 207 proximate to the connector flange 102. The cable aperture 209 is located on the tapered part 207 of the elongate tubular member 203. The cable aperture 209 allows passage of a cable from the composite pipeline to be connected.

FIG. 3 further shows that the second tubular part (pull-up cone) 204 has a first part 204a and a second part 204b. An internal surface of the second part 204b of the pull-up cone is angled with respect to an external surface of the elongate member 203 of the flange unit 200. The second tubular part may also have a dust seal. The series of locking bearings 202 are distributed concentrically around, and axially along, the flange unit part 200. Only one row of several rows of locking bearings is shown in FIG. 3. This has the effect of distributing a clamping force around a large surface area of the pipeline to protect the composite pipeline, when the connector is attached. This mitigates the potential for damage to the composite pipeline from the connector wherein the materials making up the composite pipe are softer than some alternative pipes such as steel pipes. The series of locking bearings 202 are progressively larger towards the connector flange 102. The first part 204a is thicker than the second part 204b. The internal surface of the second part 204b of the pull-up cone is angled with respect to the external surface of the elongate member 203 of the flange unit 200 to accommodate the increasing size of the locking bearings 202 when the flange unit is in a first unlocked position.

The flange unit may also have a lock ring. In the example of FIG. 3, only one cable aperture 209 is shown, however, in other examples, the flange unit may comprise a plurality of cable apertures to accommodate a plurality of cables in the composite pipeline. For example, there may be two, three or four cable apertures to accommodate two, three or four pipeline cables, respectively.

Figure 4A:
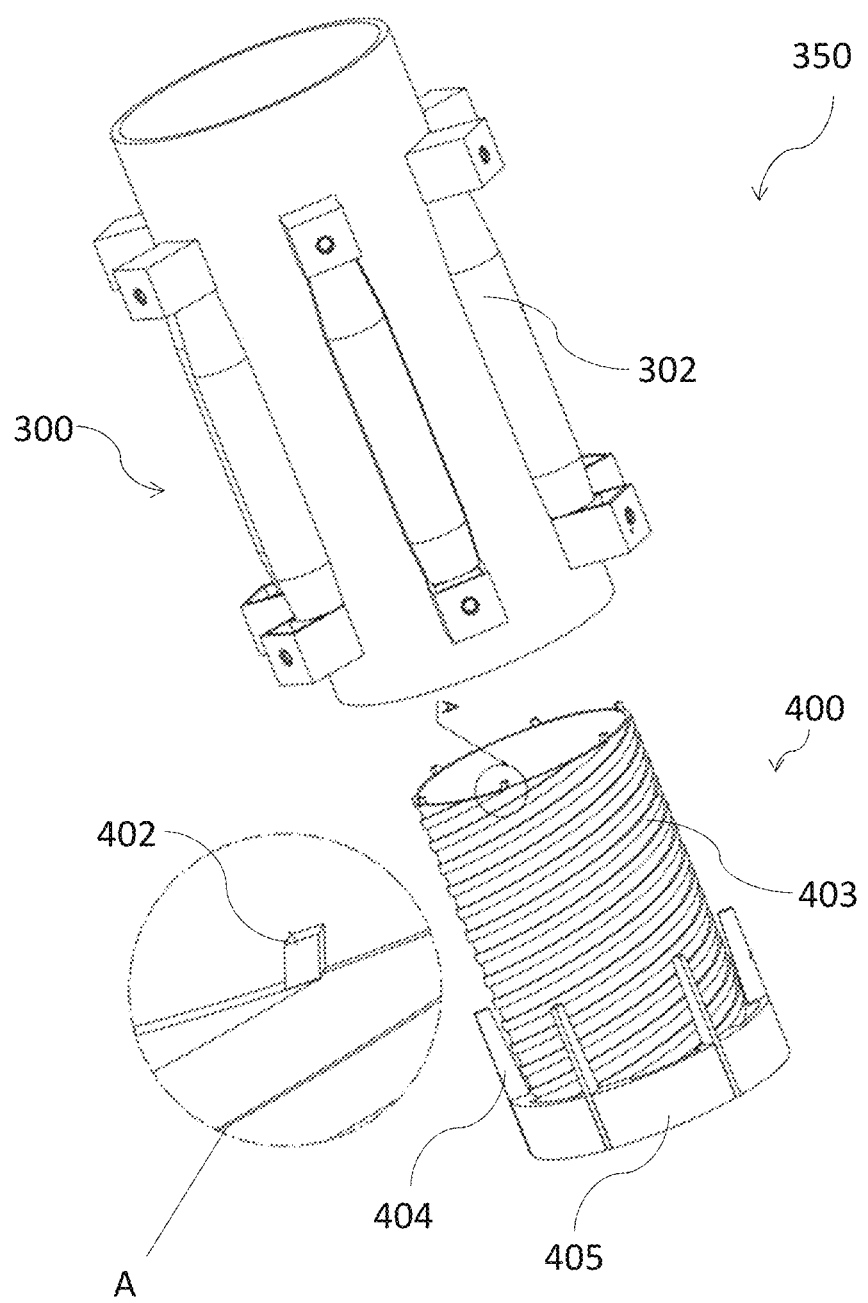
FIG. 4a is a perspective view of a first part of an example installation apparatus of the invention.
Figure 4B:
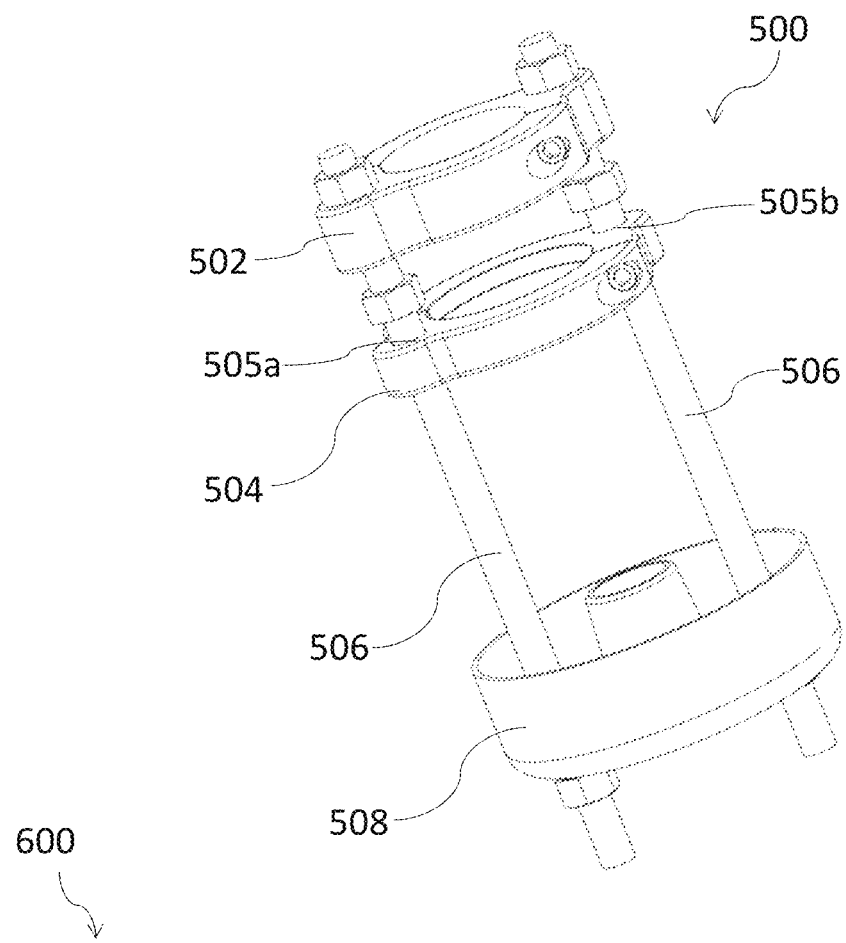
FIG. 4b is a perspective view of a second part of the example installation apparatus of the invention.
Figure 4C:
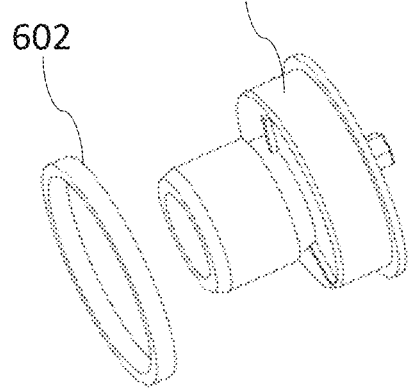
FIG. 4c is a perspective view of a third part of the example installation apparatus of the invention.

FIGS. 4a to 4c show an installation apparatus for installing a composite pipe connector, such as connector 100, onto a composite pipe.

FIG. 4a shows a first part of the installation apparatus. The first part of the installation apparatus is a reamer 350 which enables removal of material layers of the composite pipe. The reamer comprises a guide 300 and a first cutting tool 400. The guide has rollers 302. The cutting tool 400 has a series of outer-pipe cutting blades 404 and a series of insulation cutting blades 402. Enlargement view A shows an enlargement of the insulation cutting blades 402. The cutting tool 400 is an elongate cylinder 403 of a first diameter with a cutting tool flange 405 at a first end of the elongate cylinder. A diameter of the cutting tool flange 405 is greater than the diameter of the elongate cylinder 403. The diameter of the elongate cylinder 403 is approximately the same as the diameter of an internal surface of the insulation layer of the composite pipeline. The diameter of the cutting tool flange 405 is approximately the same as an inner surface of the outer-pipe layer. The insulation cutting blades 402 are located at a second end of the elongate cylinder 405. Outer-pipe cutting blades 404 are arranged around the cutting tool flange 405. In this way, the insulation layer can be dug out to a first distance and the outer-pipe layer can be stripped away to a second distance, wherein the first distance of dug out insulation layer is greater than the second distance of stripped away outer-pipe layer. The difference in distance between removed insulation layer along the pipeline and removed outer-pipe layer along the pipeline is substantially equal to a distance from a rear end of the insulation cutting blades 402 and a front end of the outer-pipe cutting blades 404. The outer-pipe support 104 is to be inserted between the inner-pipe layer and the outer-pipe layer of the composite pipeline, within the cylindrical cavity created by the excavated insulation layer. Thus, the distance from the rear end of the insulation cutting blades 402 and the front end of the outer-pipe cutting blades 404 is substantially equal to a length of the outer-pipe support 104 such that an end of the outer-pipe support 104 is flush with an end of the remaining outer-pipe layer 900.

FIG. 4b shows a second part 500 of the installation apparatus. The second part 500 of the installation apparatus is a flange unit attachment device 500 and has a first clamp (pull-up cone clamp) 504, a second clamp (outer-pipe clamp) 502, and support struts 506. The flange unit attachment device 500 also includes an inner-pipe cone tool 508. The support struts 506 extend through apertures (not shown) in the outer-pipe clamp 502, apertures 505a, 505b in the pull-up cone clamp 504, and are configured to extend through the apertures 107 in the connector flange 102. The inner-pipe cone tool 508 may also have apertures configured to receive the support struts 506 to stabilize and align the inner-pipe cone tool 508 during use.

FIG. 4c shows a third part 600 of the installation apparatus. The third part 600 of the installation apparatus is an inner-pipe cutting tool 600 for cutting an inner-pipe layer of a composite pipe to be connected. The inner-pipe cutting tool 600 has an inner-pipe reamer 604 and a distance ring 602.

Figure 5A:
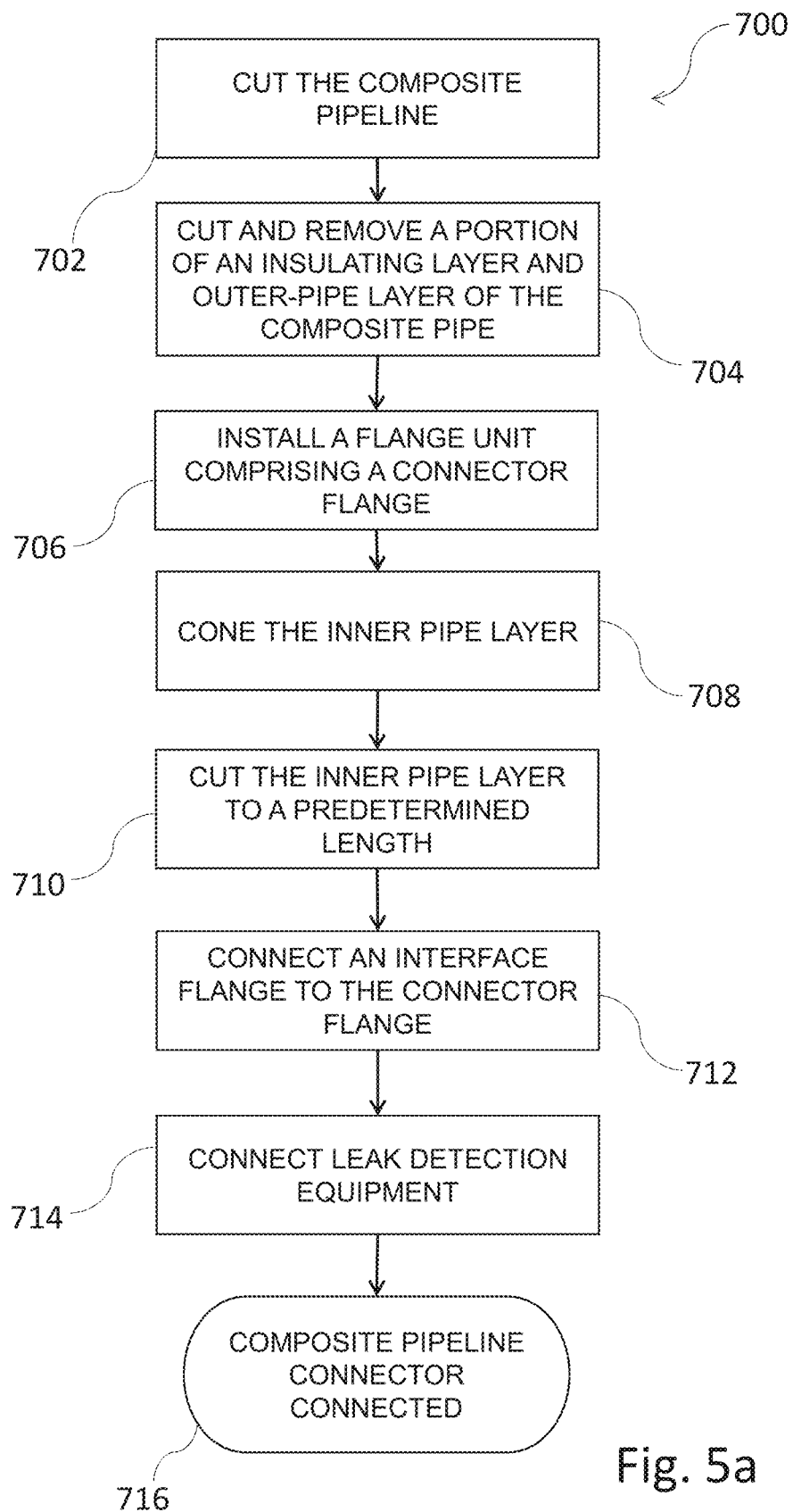
FIG. 5a is a flow diagram of a method for connecting composite pipelines according to an example of the invention.

FIG. 5a is a flow diagram of a method 700 for connecting composite pipelines. The method starts at 702 where a composite pipeline is cut at a point where installation of the connector is desired. At 704, a portion of an insulating layer of the composite pipe is dug-out to a first predetermined distance and a portion of outer-pipe layer is stripped to a second predetermined distance, exposing part of the inner pipe layer. Optionally, an outer-pipe support is slotted into a cavity created by excavated insulation layer. At 706, a flange unit comprising a connector flange is installed onto the cut composite pipe. At 708, the exposed part of the inner-pipe layer is conned such that it assumes a fluted shape. At 710, the fluted, exposed part of the inner-pipe layer is cut to a predetermined length. At 712, an interface flange is connected to the connector flange. At 714, leak detection equipment is connected to the connector. This results in a composite pipeline connector connected up to the composite pipeline 716.

Figure 5B:
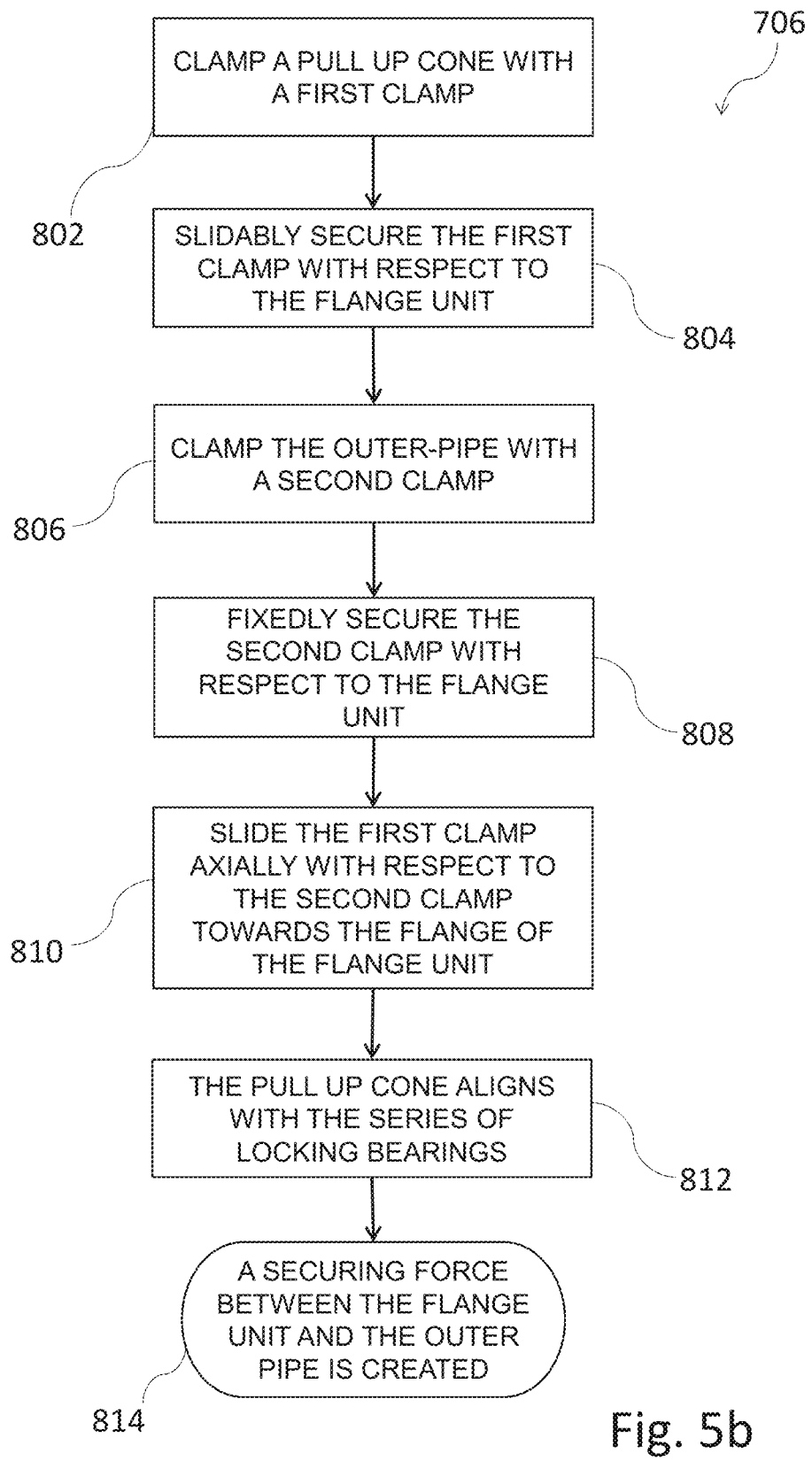
FIG. 5b is a flow diagram of a method for installing a flange unit according to an example of the invention.

FIG. 5b is a flow diagram of the method 706 for installing a flange unit. The method 706, starts at 802, wherein a pull-up cone is clamped with a first clamp (pull-up cone clamp). At 804, the pull-up cone clamp is axially, slidably secured with respect to the flange unit. At 806, a second clamp is clamped to the outer-pipe layer (outer-pipe clamp). At 808, the outer-pipe clamp is fixedly secured to the flange unit. At 810, the pull-up cone clamp is axially slid towards the flange unit. At 812, the sliding action of step 810 has caused a second portion of the pull-up cone to align with a series of locking bearings of the flange unit. The second portion of the pull-up cone has a narrower diameter to the first portion and creates a radially inward force on the series of locking bearings. The radially inward force deforms the outer-pipe layer underneath, causing the series of locking bearings to be pressed into the outer-pipe layer. Thus, a securing force is created between the flange unit and the outer-pipe, 814.

FIGS. 6 through to 17 show the method 700 of connecting a composite pipe connector using the connector 100, and installation apparatus of FIG. 4.

Figure 6A:
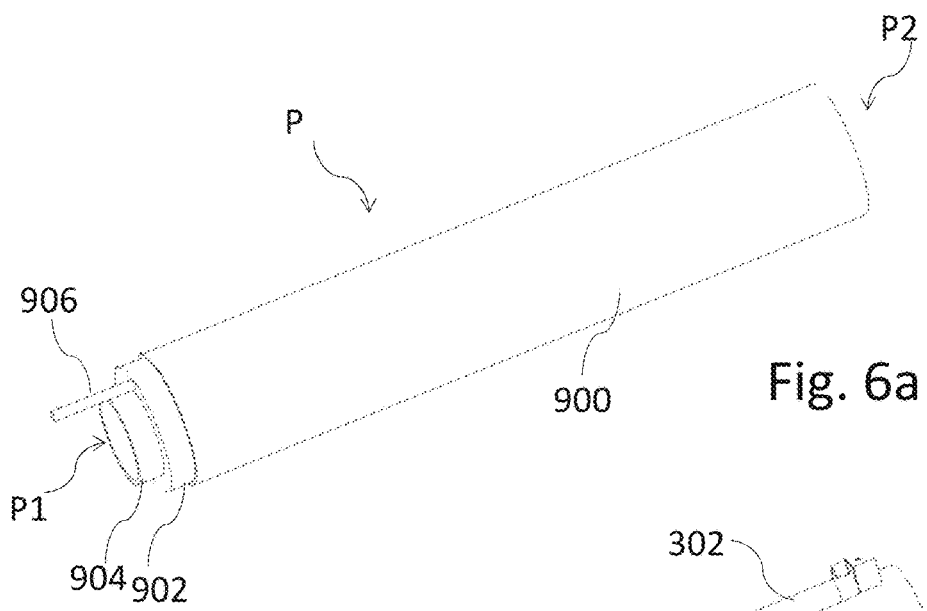
FIG. 6a shows an example pipeline section for connection with the connector of the invention.
Figure 6B:
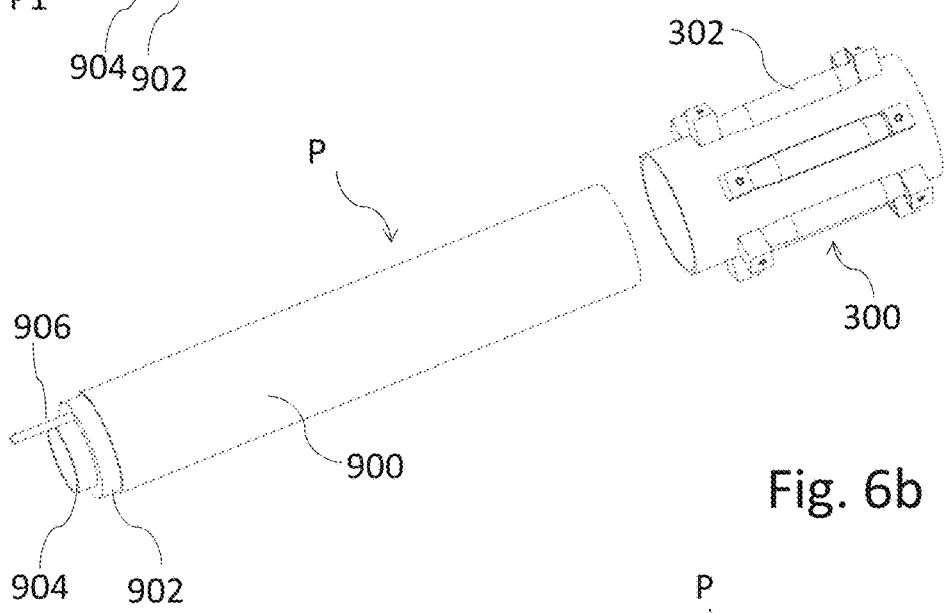
Figure 6C:
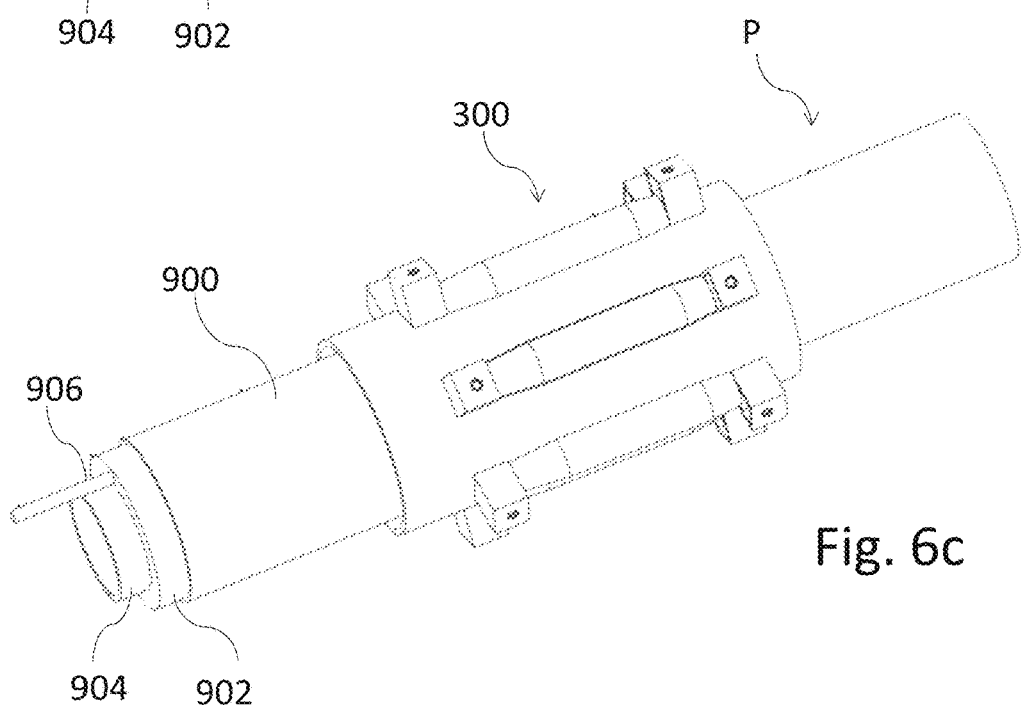
FIG. 6c shows the first part of the example installation apparatus of FIG. 4a mounted on the example pipeline section.

FIGS. 6a to 6c shows the mounting of the first part 350 of the installation apparatus on a part of a pipeline P. The pipeline P has already been cut into a section having a terminated rear end P2. A front end P1 of the pipeline, shown in the figures, shows the composite pipeline layers. This is for demonstration of the internal layers. An outer most layer of the composite pipeline P is an outer-pipe layer 900, an inner most layer is the inner-pipe layer 904 and a layer between the outer-pipe layer 900 and the inner-pipe layer 904 is an insulation layer 902. In the pipeline P in FIG. 6, a cable 906 runs through the insulation layer 902. In FIG. 6, the composite layers of the pipeline are visible to demonstrate the pipeline P structure. However, during real use, it is likely that the front end of the pipeline P will be in-situ and continuous. It is, however, possible that there is a section of pipeline P that is to be inserted into a pipeline. In which case the composite pipeline connector described herein can be connected on the front end P1 and the rear end P2 of a pipeline section.

As shown in FIGS. 6a to 6c, the guide 300 is slid axially over pipeline P and positioned at the predetermined distance along the length of the pipeline P. The guide guides the cutting tool 400 to cut the predetermined amount of insulation layer 902 and outer-pipe layer 900.

With further reference to FIG. 4a, the cutting tool 400 has a series of outer-pipe cutting blades 404 and a series of insulation cutting blades 402. Enlargement view A shows an enlargement of the insulation cutting blades 402. Rotation of the cutting tool 400 causes blades 402 to carve out the insulation layer 902 between the outer-pipe layer 900 and the inner-pipe layer 904. When the outer-pipe blades 404 abut the outer-pipe layer 900 they strip the outer-pipe layer. Some remaining parts of the insulation layer may be carefully removed from by hand, for example, remaining material around the cable 906. This process step reflects step 704 of the method 700 for connecting composite pipelines.

Figure 7A:
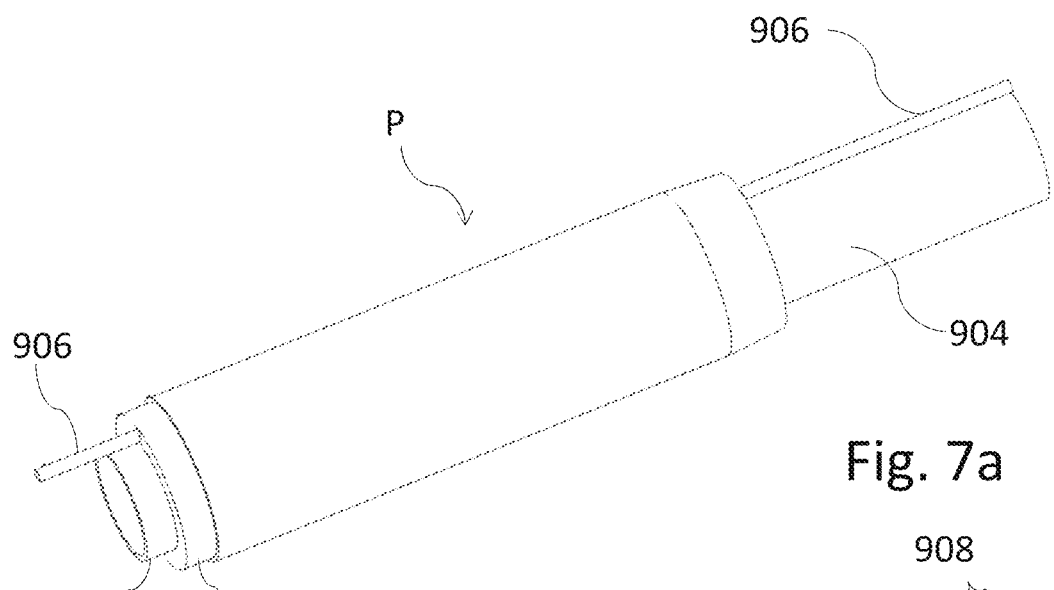
FIG. 7a shows the example pipeline section with a portion of an outer-pipe layer and an insulating layer removed.
Figure 7B:
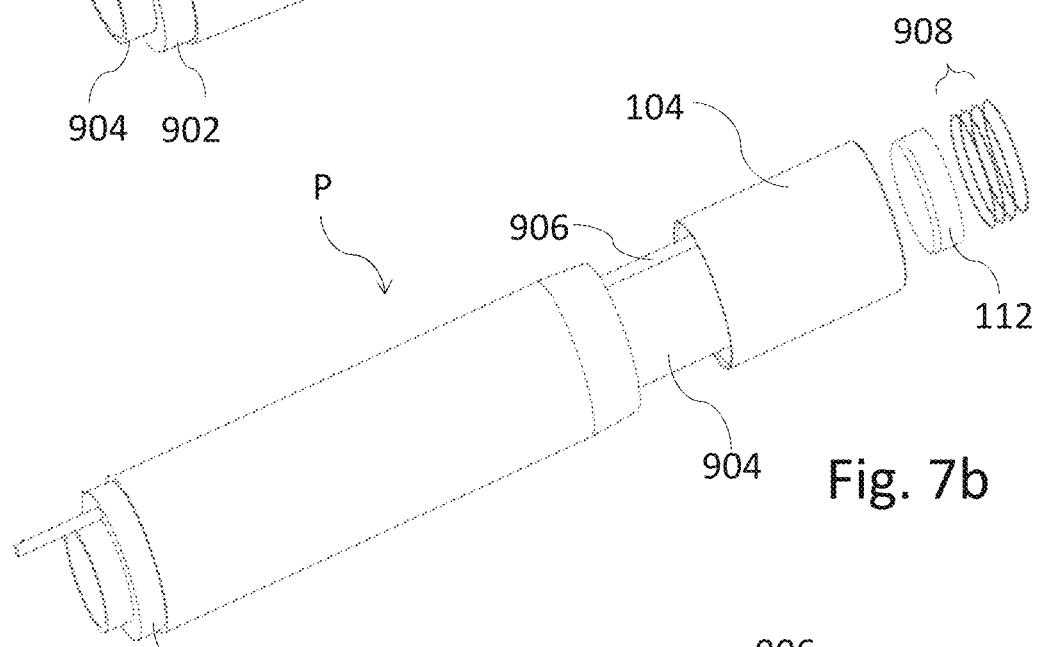
Figure 7C:
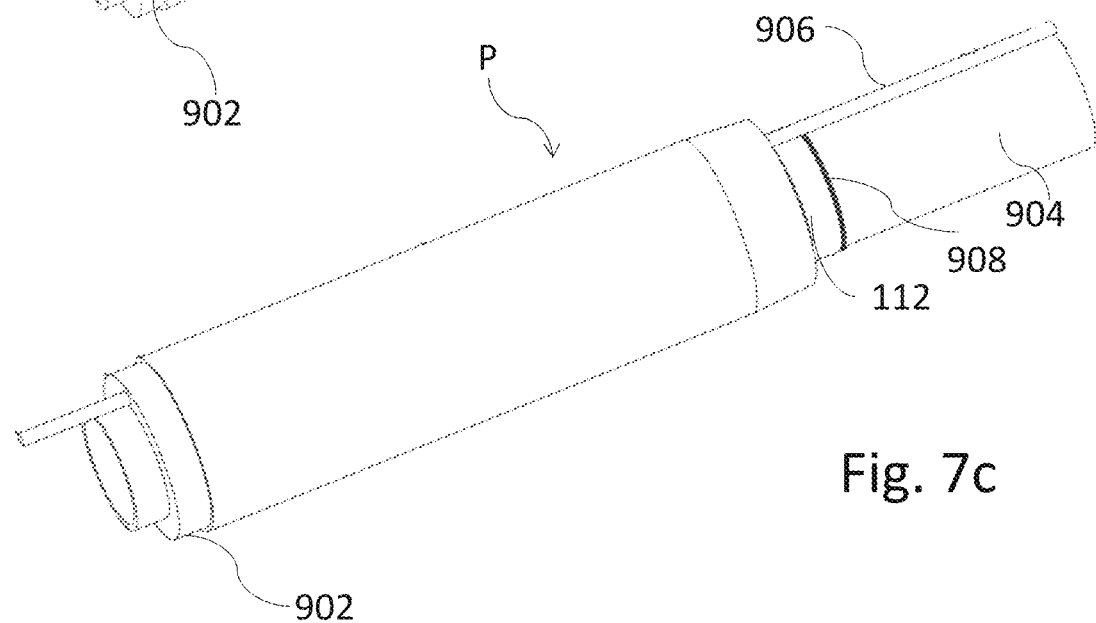
FIG. 7c shows the pipeline section of FIG. 7a with the outer-pipe support and the inner-pipe support mounted thereto.

FIGS. 7a to 7c show the mounting of the inner-pipe support 112, the outer-pipe support 104 and o-rings 908 onto a stripped pipeline P. FIG. 7a shows the pipeline P after a portion of the insulation layer 902 and a portion of the outer-pipe layer 900 have been removed. Insulation has been carefully removed from the cable 906 to expose said cable 906. The outer-pipe support 104 is axially slid onto the pipeline P and into the cavity created by excavating a portion of the insulation layer. The outer-pipe support 104 may have dimensions configured such that the internal surface of the outer-pipe support 104 is contiguous with the external surface of the inner-pipe layer 904 of the pipeline P and/or an external surface of the outer-pipe support is contiguous with the internal surface of the outer-pipe layer 900. The outer-pipe support 104 may be made from a hard plastic. The inner-pipe support 112 is also axially slid onto the pipeline P, and provides a sealing function. The inner-pipe support 112 has dimensions configured such that the internal surface of the inner-pipe support 112 is contiguous with the external surface of the inner-pipe layer 904 of the pipeline P. The inner-pipe support 112 has a thickness such that it sits between the inner-pipe layer 904 and the cable 906 of the stripped section of the pipeline P. The o-rings 908 are axially slid onto the pipeline P and are configured to seal the inner-pipeline against the inner-pipe support 112. The outer-pipe support 104 is positioned on the pipeline section underneath the outer-pipe layer 900. When the connector is in place, the clamping force produced by the series of locking bearings and the pull up cone is substantially axially aligned with the outer-pipe support 104 which has the effect of protecting the outer-pipe layer 900. Without the outer-pipe support 104, and due to the relatively soft material of the outer-pipe layer 900, the outer-pipe layer may deform or collapse under the clamping force.

FIGS. 8a to 8c show the pipeline section of FIG. 7c with a flange unit 200 mounted thereto. A section B of the cross-sectional view of the flange unit 200 and pipeline P is also shown in FIG. 8c. The pull-up cone 204 is pulled in a direction away from the connector flange 102 and then, the flange unit 200 is axially slid onto the pipeline P until the tapered part 207 of the elongate member 203 is stopped by abutment with a first edge of the remaining outer-layer 900 and a first edge of the outer-pipe support 104. A non-tapered part of the elongate member 203 extends around the outer-pipe layer 900 of the pipeline P. Preferably, an inner surface of the tapered part 207 of the elongate member 203 is configured to be contiguous with an outer surface of the inner-pipe layer 904. Preferably, an inner surface of the non-tapered part of the elongate member 203 is configured to be contiguous with an outer surface of the outer-pipe layer 900. The cable 906 is fed through the cable aperture 209. At this stage of installment, the pull-up cone 204 is still in a pulled back position wherein the pull-up cone has been pulled in a direction away from the connector flange 102. In the pulled back position, the second part 204b of the pull-up cone lies over the series of locking bearings 202 and their respective locking apertures 205. Thus, the pull-up cone 204 is in the pulled back position when the flange unit is in the first, unlocked position. An internal surface of the first part 204a of the pull-up cone is contiguous with an external surface of the elongate member 230.

Figure 9A:
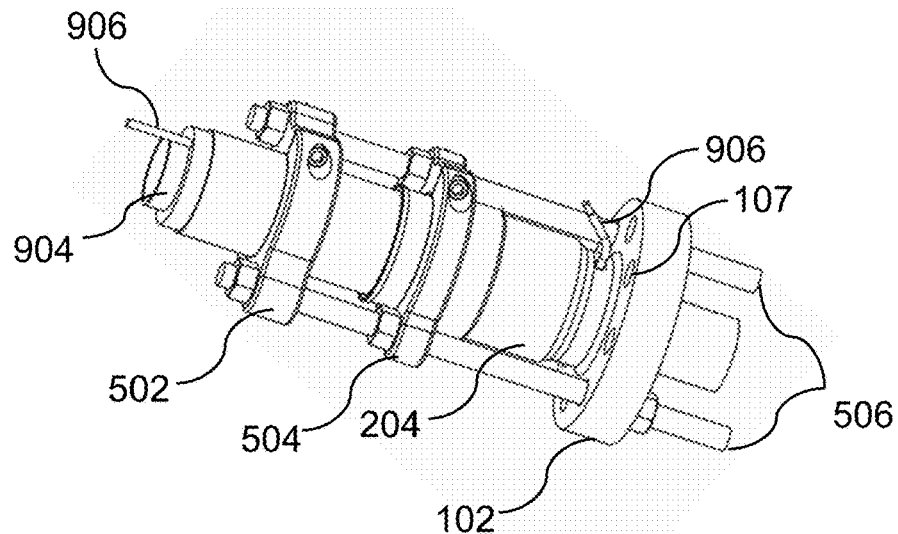
FIG. 9a is a perspective view of the pipeline section of FIG. 8a with mounted flange unit with a third part of an installation apparatus further mounted thereto.
Figure 9B:
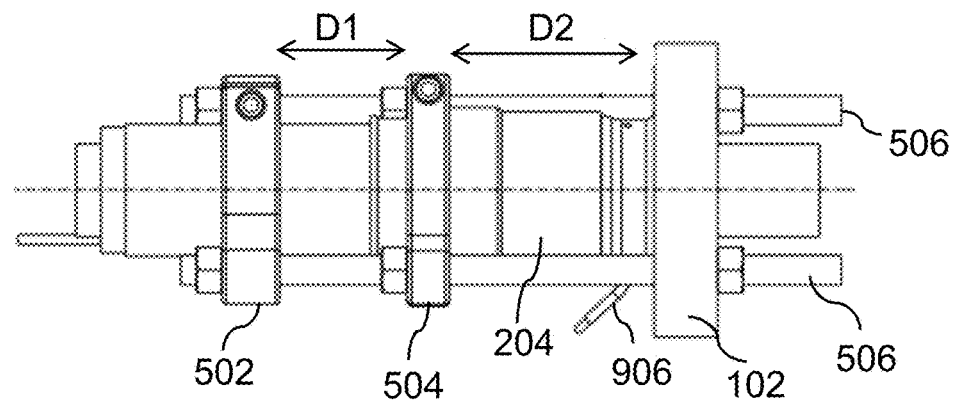
Figure 9C:
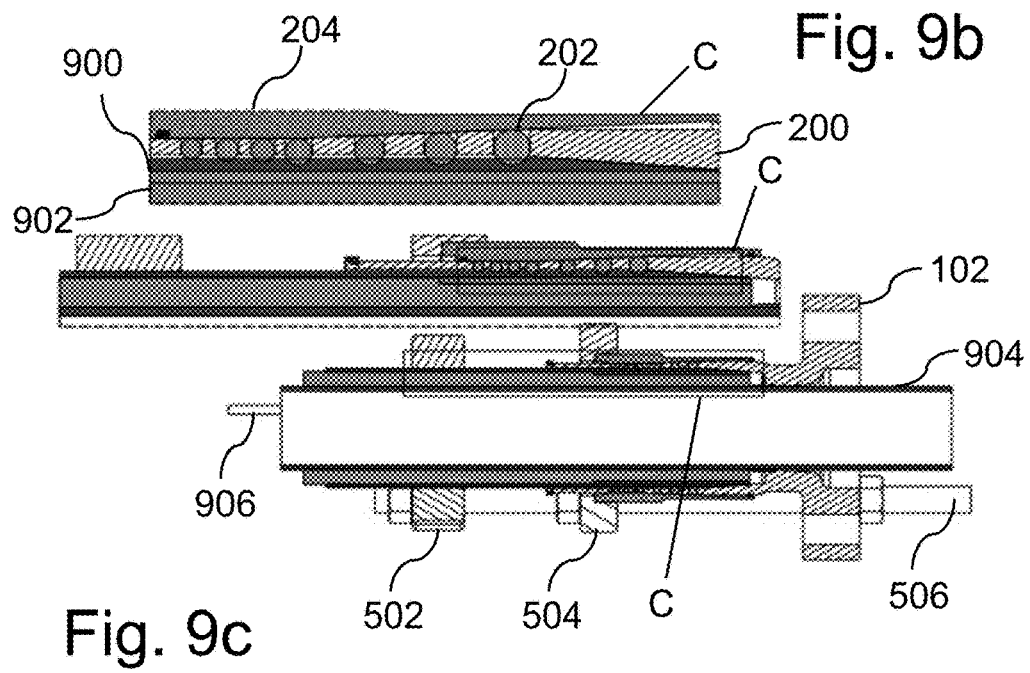

FIGS. 9a to 9c show the pipeline P and mounted flange unit 200 with a second part of an installation apparatus, the flange unit attachment device 500, further mounted thereto. The pull-up cone clamp 504 is tightened around the pull-up cone 204. This process step reflects step 802 of the method 706 for installing the flange unit.

First and second struts 506 are slotted into respective first and second apertures in the pull-up cone clamp 504 and through apertures 107 in the connector flange. A nut is tightened along each of the struts 506 until abutment with a first side of the pull-up cone clamp 504, the first side being opposite to the side towards the connector flange 102. This process step reflects step 804 of the method 706 for installing the flange unit.

First and second apertures in the outer-pipe clamp 502 are slotted over first and second struts 506. The outer-pipe clamp 502 is tightened concentrically over the outer-pipe 900. Preferably, the outer-pipe clamp 502 is tightened around the outer-pipe support 104 which serves to reinforce the outer-pipe layer 900, and pipeline in general, from the pressure exerted by the clamp 502. Nuts are tightened along the struts until abutment with a first side of the outer-pipe clamp 502, the first side opposite to the side towards the connector flange 102. This process step reflects step 806 and 808 of the method 706 for installing the flange unit 200.

First and second struts 506 are connected to the outer-pipe clamp 502, the pull-up cone clamp 504 and the connector flange 102 by slotting through their respective apertures. A nut is also tightened to a second end of each of the struts 506 until abutment with the connector flange 102. At this stage of installation, the outer-pipe clamp 502, the struts 506 and the connector flange 102 form a rigid frame around the pipeline P. As shown in FIG. 9b, the pull-up cone clamp 504 lies at a distance from the outer-pipe clamp 502 of D1 and at a distance from the connector flange 102 of D2. The example herein has been described with respect to two struts 506, engaging with two apertures in each of the clamps 502, 504 and the connector flange 102. However, more than two, such as three, or four struts may be used.

Figure 10A:
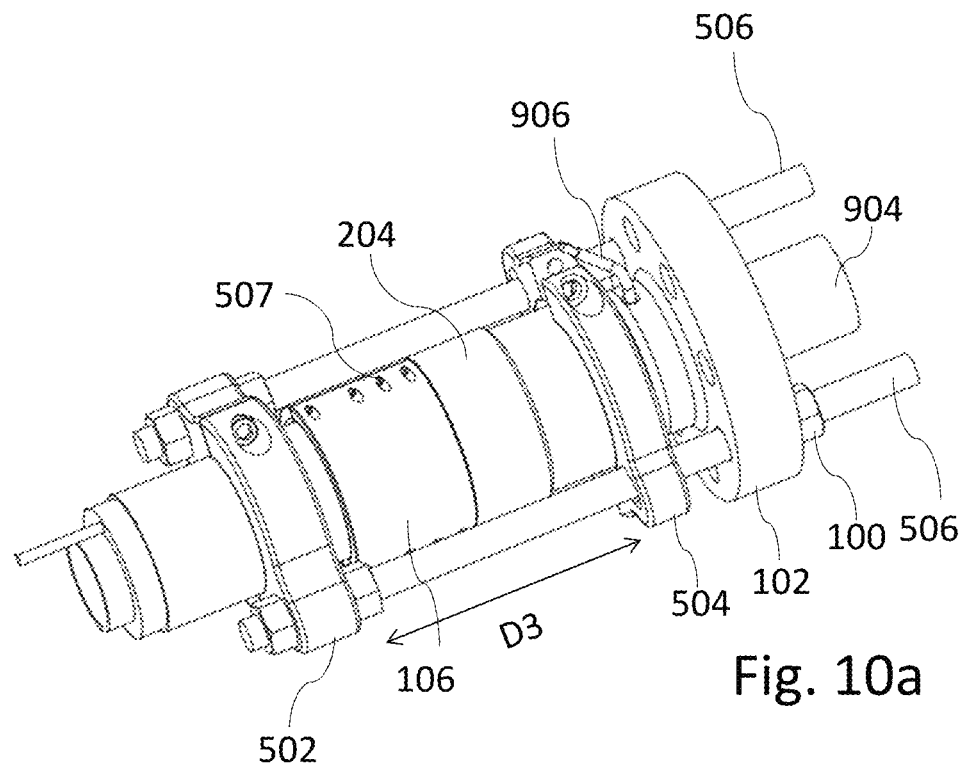
FIG. 10a is a perspective view of the pipeline section of FIG. 9a with a second tubular part slid towards a flange of the flange unit.
Figure 10B:
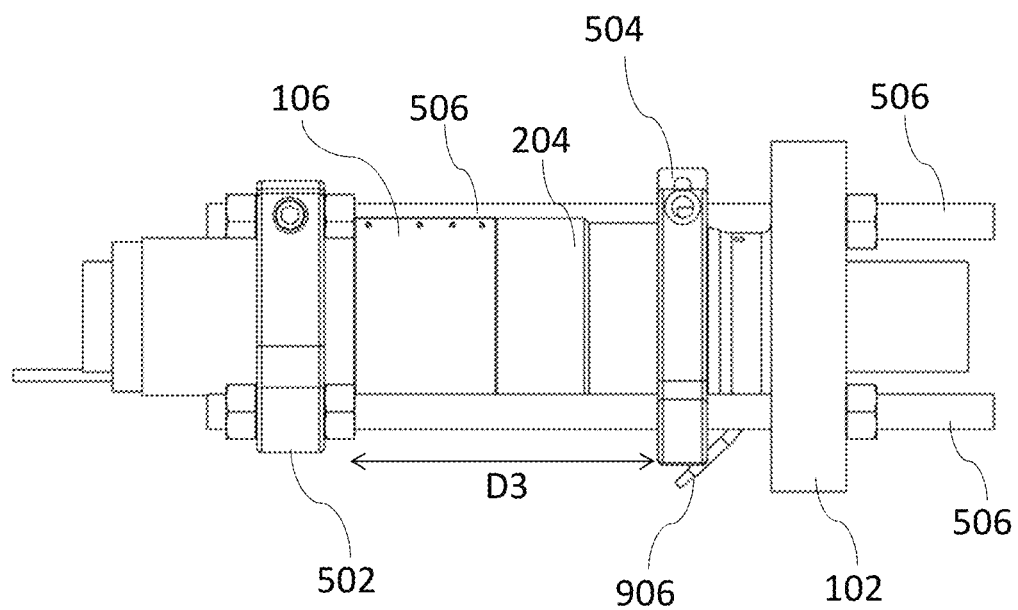

FIGS. 10a and 10b show the pipeline section of FIG. 9a with the second tubular part slid towards the connector flange 102 of the flange unit 200. The pull-up cone clamp 504 is slid axially along the struts 506 such that the pull-up cone clamp 504 is at a distance of D3 from the outer-pipe clamp 502. Sliding the pull-up cone clamp 504 slides the pull-up cone 204 by substantially the same distance. The distance between D1 and D3 is between 30-90 mm, preferably 40-80 mm, more preferably 65 mm. This process step reflects step 810 of the method 706 for installing the flange unit. Sliding up the pull-up cone clamp 504 puts the flange unit 200 in the locked position since the narrower cross-section of the of the first part 204a of the pull-up cone engages with the series of locking bearings 202. The series of locking bearings are pushed radially inward into the series of locking apertures and into the outer-pipe layer, deforming the outer-pipe layer. This process step reflects step 812 of the method 706 for installing the flange unit.

The above-described method for installing the flange unit reflects step 706 in the method 700 for connecting composite pipelines.

The pull-up cone clamp 504 can then be split to release it from the pull-up cone 204 and the clamp 504 slid further towards the top of the flange unit 200, the top being proximate to the connector flange 102. The antivibration sleeve 106 is then attached to the outer-pipe of the pipeline below the pull-up cone 204. The antivibration sleeve 106 provides dampening to vibrations arising from fluid that is transported by the pipeline. It is especially important to have a vibration mitigating means at a pipeline connector point since the connector point may increase fluid turbulence. Fluid turbulence can lead to vibrations that cause the pipeline and connector integrity to deteriorate. It is of yet further importance to have a vibration mitigation means when the connector is the interface between two pipeline types, for example, a composite pipeline and the steel pipeline since the interface between two materials may increase fluid turbulence yet further. The antivibration sleeve has two parts which can be joined together with a series of assembly bolts 507. Thus, the benefit of having two struts diametrically opposed around the pipeline P is that the anti-vibration sleeve 106 can be attached whilst the flange unit installation device 500 is still attached.

FIGS. 11a to 11c show the pipeline section of FIG. 10a with the inserted inner-pipe cutting tool. Prior to using the inner cutting tool 604, the exposed inner-pipe section may be precut to remove some excess inner-pipe layer. The distance ring 602 is slid onto the inner cutting tool 604 such that when the inner cutting tool 604 is used, the exposed inner-pipe section is cut leaving an overlap of inner-pipe section extending beyond the tapered section 207 of the flange unit 200. This excess accommodates fluting of the inner-pipe section as described below. The inner-pipe cutting tool 604 is then removed from the connector 100.

Figure 12A:
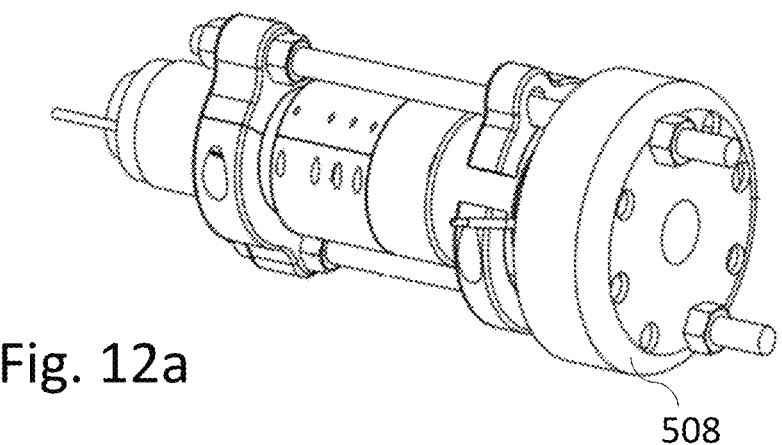
FIG. 12a is a perspective view of the pipeline section of FIG. 10a with an inserted inner-pipe layer coning tool.
Figure 12B:
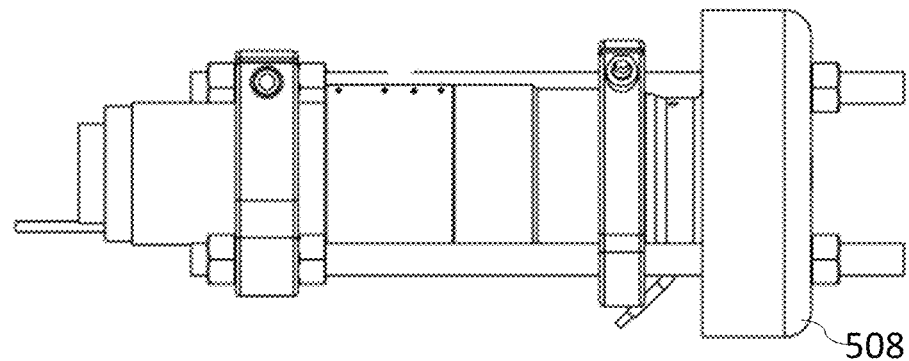
Figure 12C:
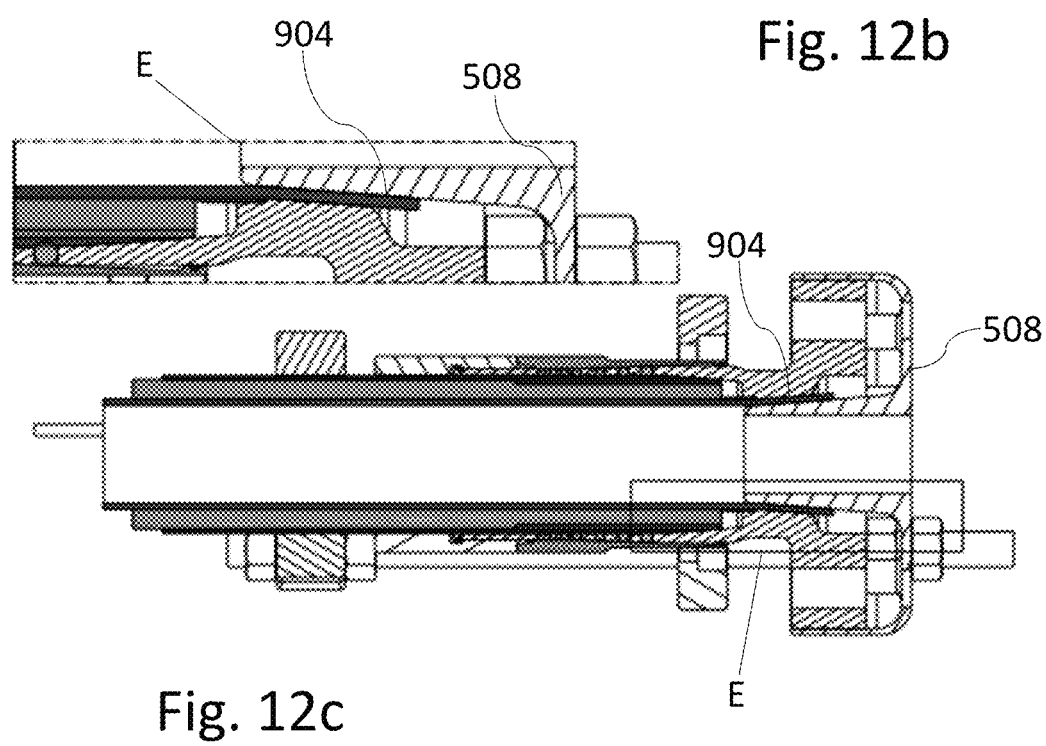

FIGS. 12a to 12c show the pipeline P of FIG. 10a with an inserted inner-pipe layer coning tool 508. An electrical heating element is connected to the inner-pipe coning tool 508 to heat the coning tool 508 which molds the inner-pipe into the desired fluted shape. Preferably, the heater has an indicator light. When the indicator on the heater indicates the heater is at temperature, the conning tool 508 is forced against the flange unit 200 until it a stopping resistance is felt. As shown in FIG. 12c, the inner-pipe conning tool 508 has an internal frustoconical section and an external cap part. The internal section of the inner-pipe coning tool 508 is complementary with an internal section of an end of the flange unit 200. Thus, the remaining exposed inner-pipe section is pressed between the connector flange 102 and the inner conning tool 508 to flute the inner-pipe section outwards. Thus, the inner-pipe 904 follows the profile of the internal surface of the flange unit 200. The heater is then turned off and, when the indicator light indicates that the conning tool 508 has cooled, the coning tool 508 is removed. This process step reflects step 708 in the method 700 for connecting composite pipelines.

Figure 13A:
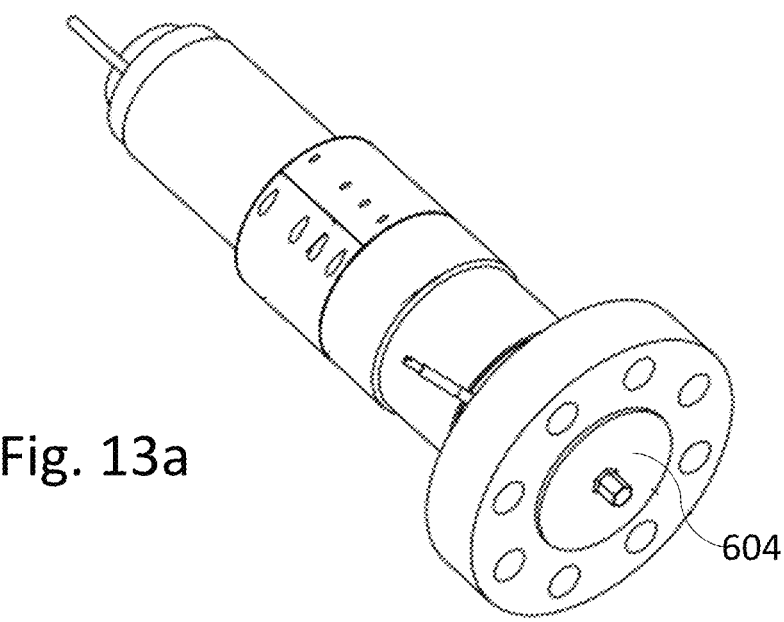
FIG. 13a is a perspective view of the pipeline section of FIG. 10a with a reinserted inner-pipe cutting tool.
Figure 13B:
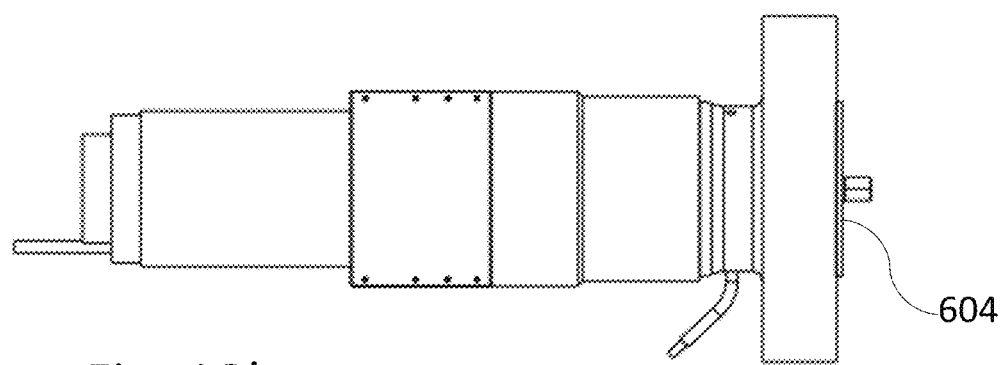
Figure 13C:
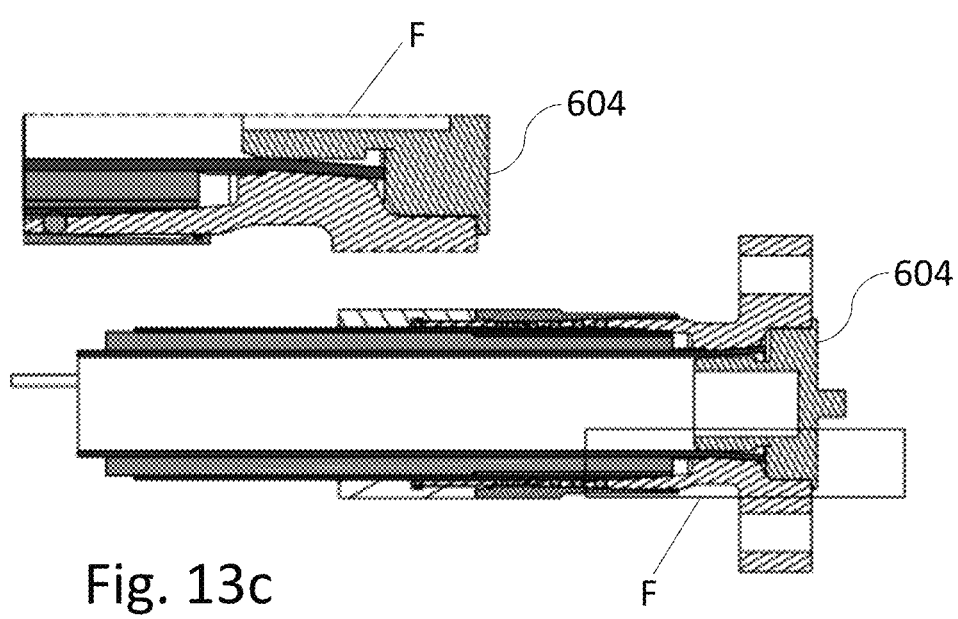

FIGS. 13a to 13c show the pipeline P of FIG. 12a with the reinserted inner-pipe cutting tool 604. The cutting tool 604 is reinserted into the connector 100 without the distance ring 602. At this stage the inner-pipe section is cut to align with the end of the tapered part of the elongate member 203. After this stage is complete, the inner-pipe section lines the internal surface of the flange unit 200 up to the end of the tapered section 207 of the flange unit 200. This process step reflects step 710 in the method 700 for connecting composite pipelines.

Figure 14A:
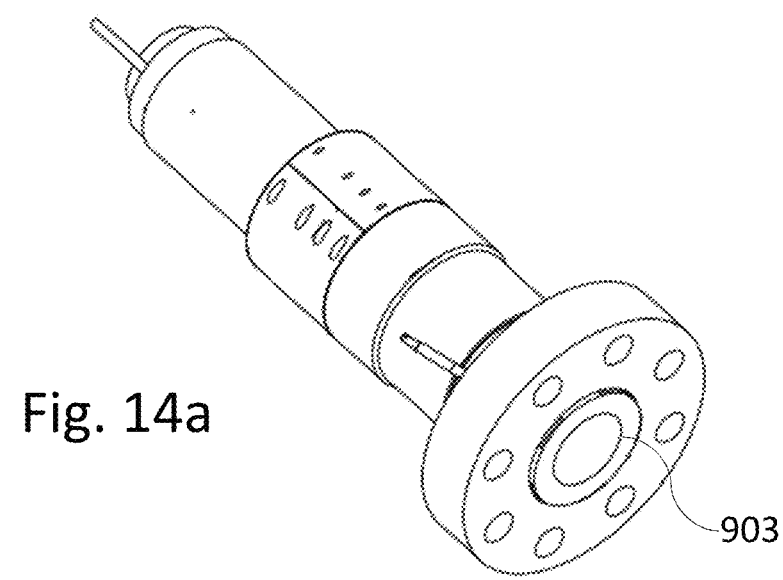
FIG. 14a is a perspective view of the flange unit installed on the pipeline.
Figure 14B:
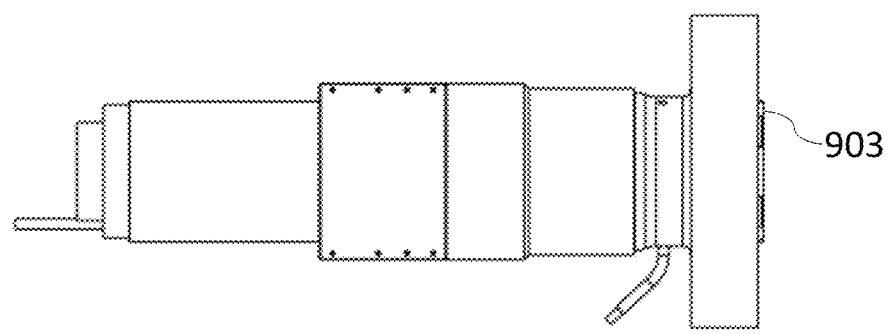
Figure 14C:
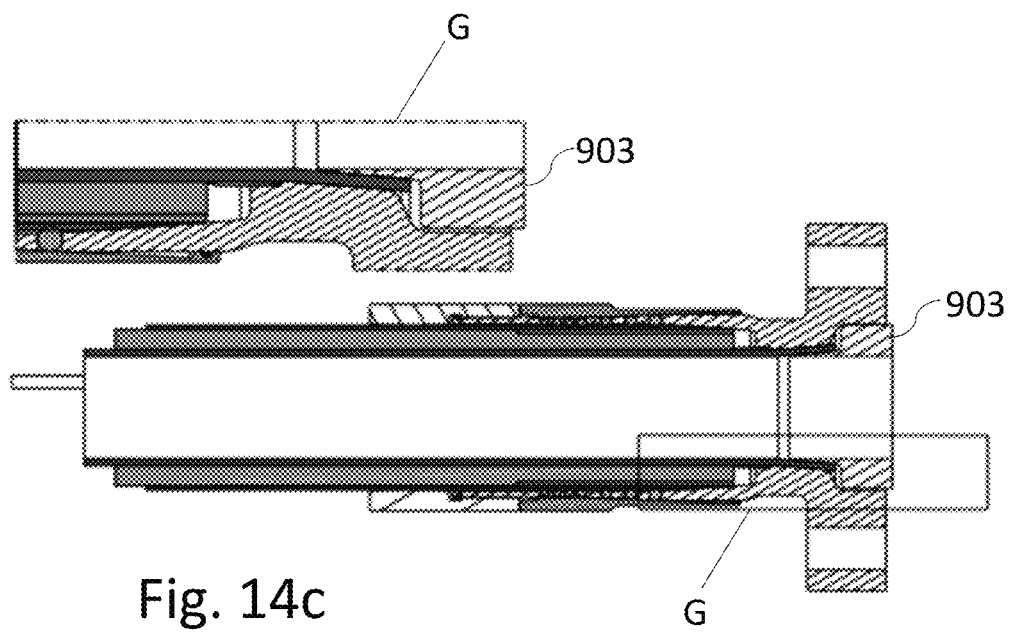

FIGS. 14a to 14c show the pipeline section of FIG. 13a with an inserted inner-pipe seal cone 903. The inner-pipe sealing cone 903 seals the inner-pipe layer between the sealing cone 903 and the flange unit 200. The inner-pipe sealing cone 903 also has the effect of leveling the internal cross-sectional area over the composite pipe connection transition. Thus, disruption to the fluid dynamics of fluids in transport through the pipe are mitigated at the connection point, minimizing fluid turbulence.

Figure 15A:
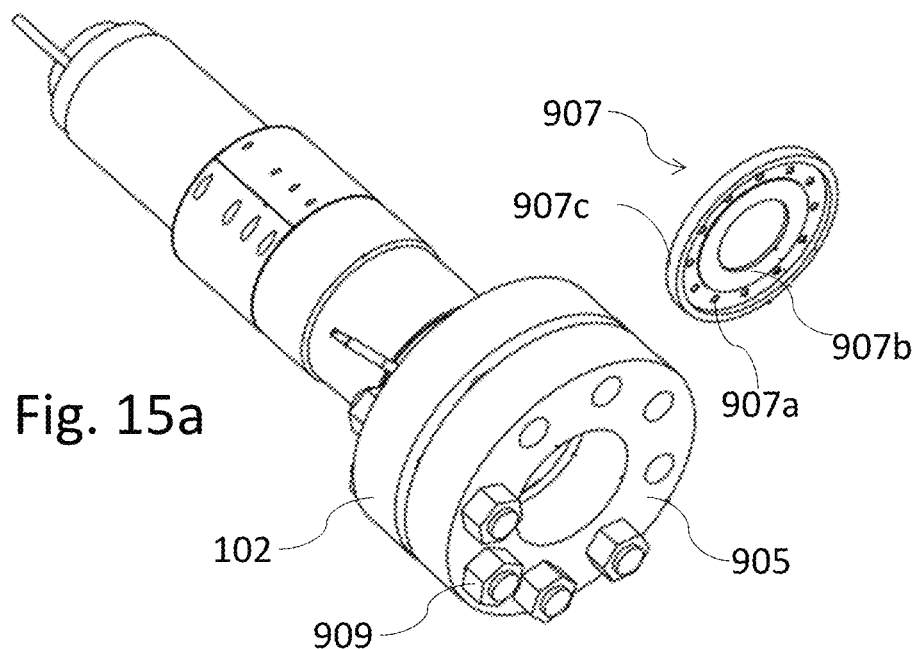
FIG. 15a is a perspective view of the pipeline section of FIG. 14a with an interface flange attached.
Figure 15B:
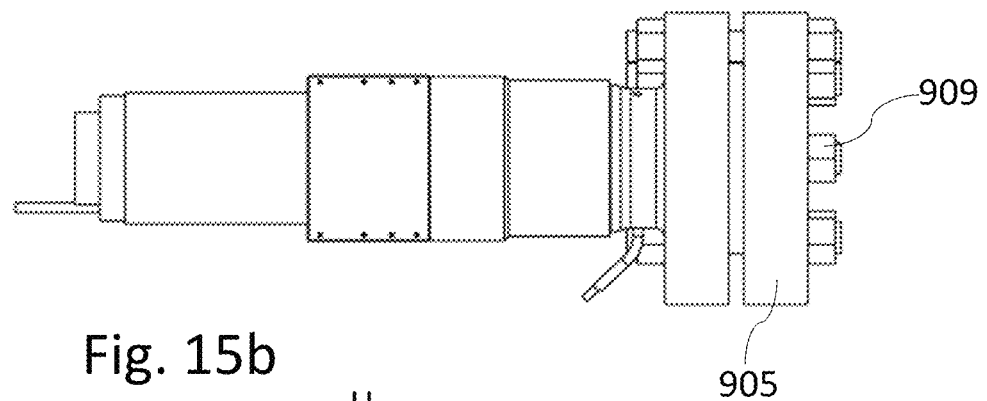
Figure 15C:
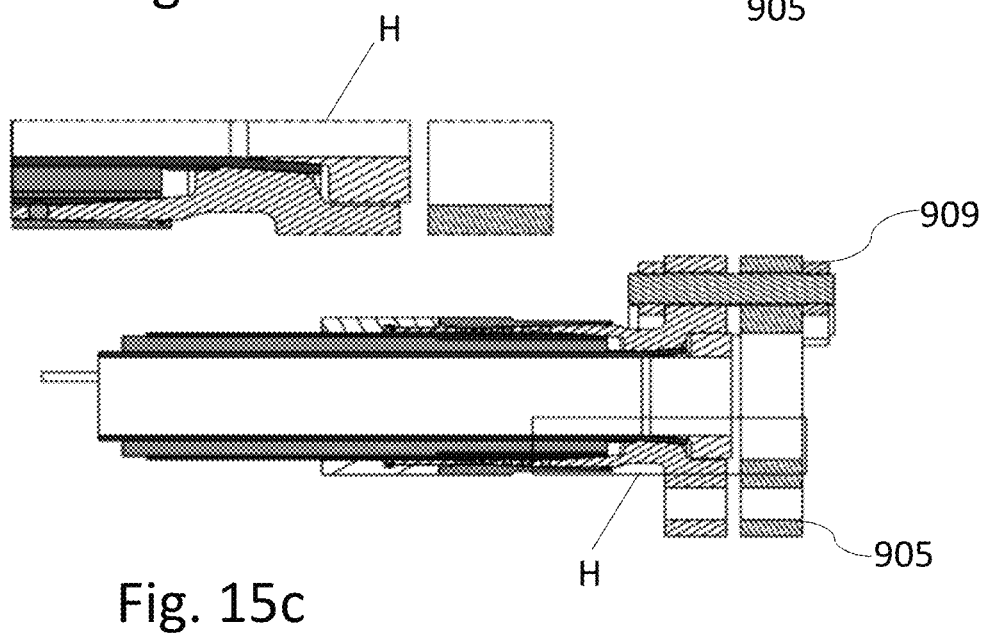

FIGS. 15a to 15c show the pipeline section of FIG. 14a with the interface flange 905 attached. A monitoring flange gasket 907 is install into a well in the connector flange 102 of the flange unit. The monitoring flange gasket 907 has inner-pipe leak detection holes 907a, an inner-pipe seal 907b and a leak detection area 907c. After installation of the monitoring flange gasket 907, the interface flange 905 is connected to the connector flange 102 by threading bolts 909a through aligning apertures in the interface flange and the connector flange and tightening complimentary nuts on either side of the interface flange—connector flange arrangement. This process step reflects step 712 in the method 700 for connecting composite pipelines.

Figure 16A:
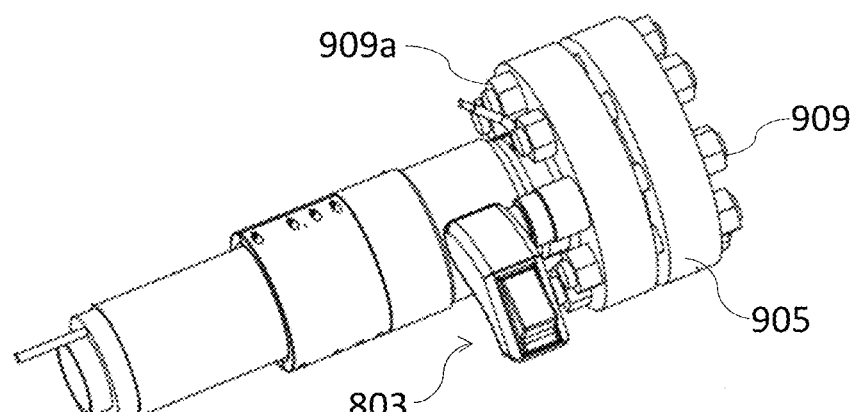
FIG. 16a is a perspective view of the pipeline section of FIG. 15a showing a hytorc tool for tightening flange bolts.
Figure 16B:
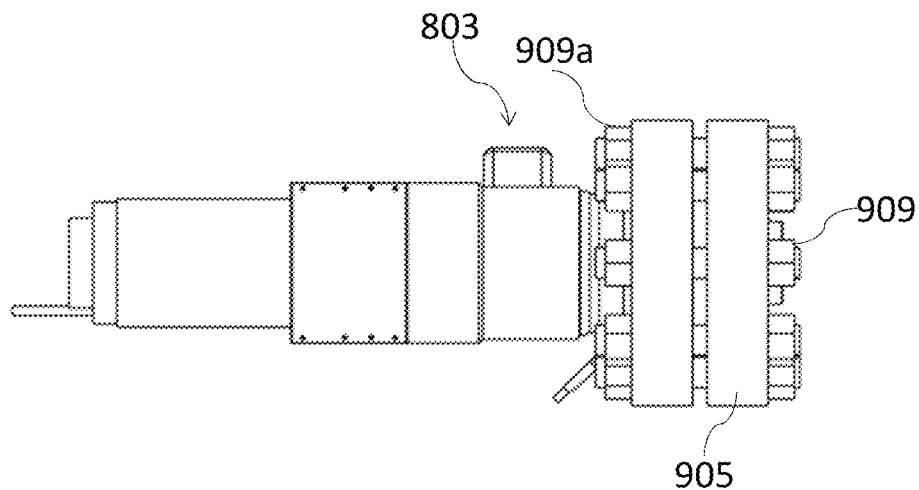
Figure 16C:
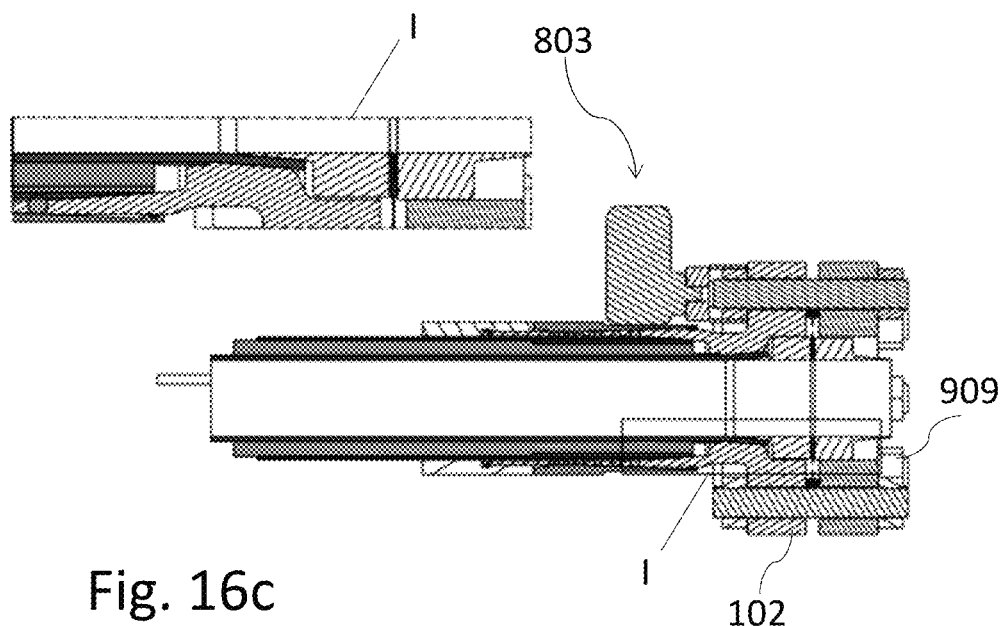

As shown in FIGS. 16a to 16c, nuts 909a are tightened with a hytorc tool 803. Using this method for tightening flange nuts results in an adequate seal between the connector flange and the interface flange.

Figure 17A:
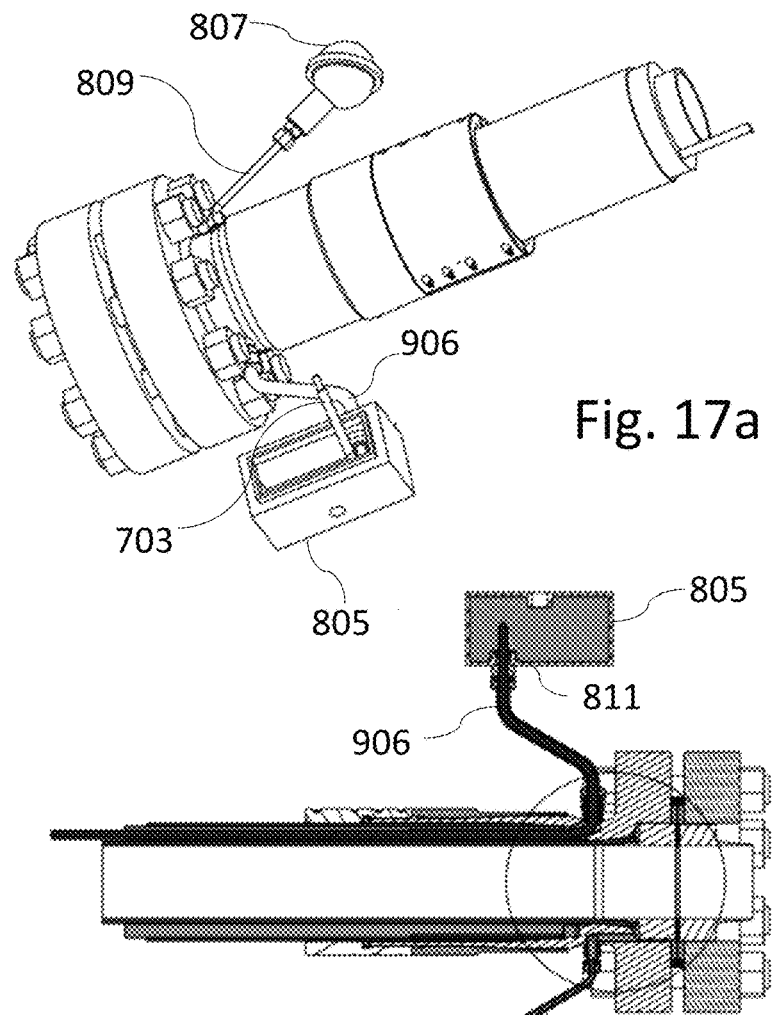
FIG. 17a is a perspective view of the pipeline section of FIG. 15a with attached leak detection equipment.
Figure 17B:
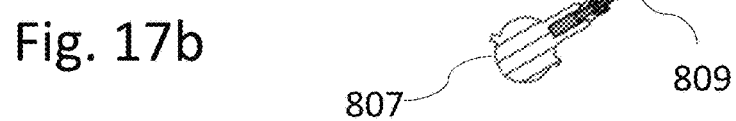
Figure 17C:
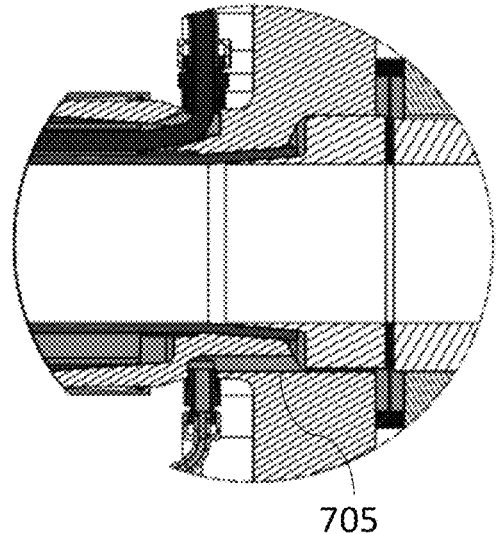
FIG. 17c is an enlarged view of FIG. 17b.

FIGS. 17a to 17c show the pipeline section of FIG. 15a with attached leak detection equipment. The leak detection equipment includes a junction box 805 with leak detection monitoring. The junction box has a port 811 for connecting the cable 906 of the composite pipe. The leak detection equipment further includes a leak monitoring sensor 807 connectable to the connector 100 via tube 809. When the tube 809 is correctly installed, it is in fluid communication with an area between the inner-pipe 904, the inner-pipe sealing cone 903 and the connector flange 102. Thus, the leak monitoring sensor 807 can detect leaking of fluid in the pipeline at the connection point. This process step reflects step 714 in the method 700 for connecting composite pipelines.

The above-described connector, kit of part and method for connecting a composite pipeline is adapted for use with a multi-layer pipeline. In particular, a multilayer pipeline for use in transporting oil and gas. The connector, kit of part and method for connecting a composite pipeline is adapted to connect composite pipelines having at least one inner-pipe layer, at least one outer-pipe layer and at least one middle layer (insulation layer between the inner-pipe layer and outer-pipe layer). The composite pipe may have cables, such as fiber-optic cables, carrying information regarding the state of the pipeline.

Figure 18A:
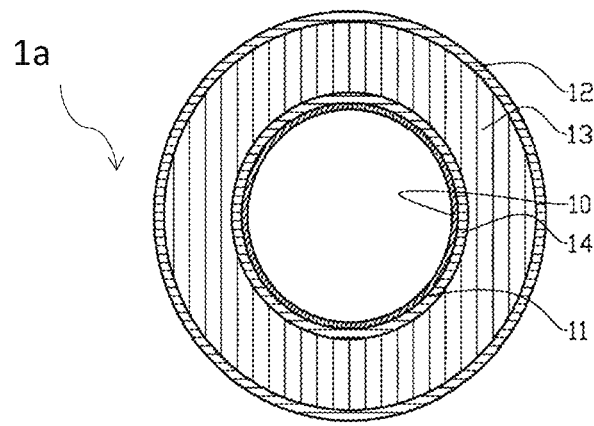
FIG. 18a is an example composite pipeline.
Figure 18B:
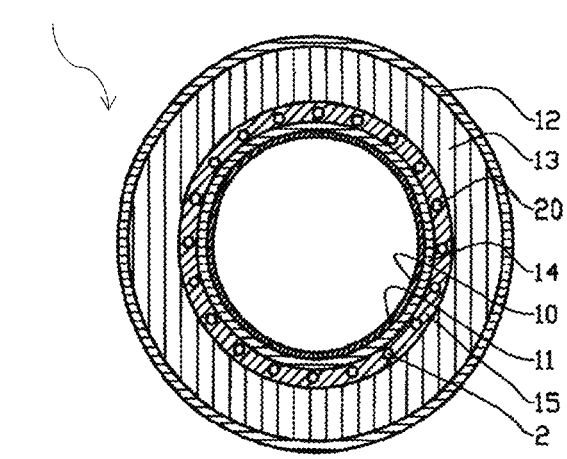
FIG. 18b is a further example composite pipeline.
Figure 18C:
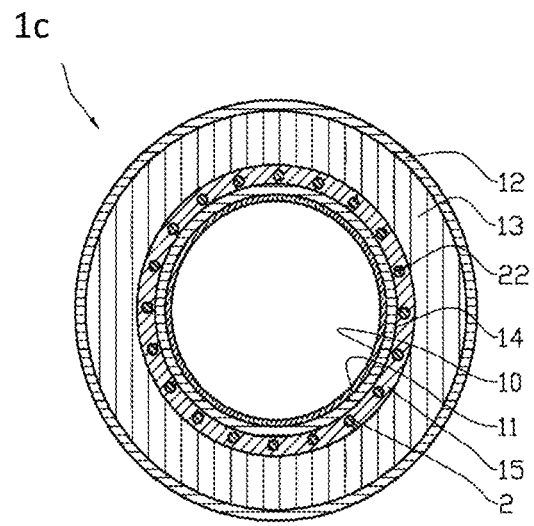
FIG. 18c is a yet further example composite pipeline.

FIGS. 18a to 18c show example composite pipes that the connector described herein can be used with.

FIG. 18a shows a first example multilayer pipeline 1a composed of an inner, fluid-tight wear ply 11, also called liner, an inner fibre-reinforced polymer ply 14
surrounding the inner wear ply 11, a first intermediate ply 13, and an outer fibre-reinforced polymer ply 12. The inner wear ply 11 and the first intermediate ply 13 may be formed of an extruded thermoplastic polymer material which may be the same material in both plies, such as thermoplastic polyurethane, or different polymer materials. The first intermediate ply 13 may consist of a foamed or expanded, thermoplastic polymer material and will then constitute an insulating ply 13. The insulating ply 13 may include so-called heavy-duty insulation. Expanded or foamed polypropylene, polyethylene and thermoplastic polyurethane constitute examples of heavy-duty insulation. As an alternative, the insulating ply 13 may be formed from so-called light-duty insulation. Expanded or foamed polystyrene constitutes an example of light-duty insulation.

FIG. 18*b* shows a second example multilayer pipeline 1*b* composed of an inner wear ply 11, of an outer fibre-reinforced thermoplastic polymer ply 12, a first intermediate ply 13, an inner fibre-reinforced thermoplastic polymer ply 14 surrounding the inner wear ply 11, and a second intermediate, thermoplastic polymer ply 15. The second intermediate, thermoplastic polymer ply 15 is provided with at least one element 2 extending axially in the second intermediate polymer ply 15. The second intermediate, thermoplastic polymer ply 15 surrounds the inner fibre-reinforced, thermoplastic polymer ply 14, and the first intermediate ply 13 is positioned between the outer fibre-reinforced polymer ply 12 and the second intermediate polymer ply 15. In this example pipeline, the element 2 includes closed channels 20. The closed channels 20 may accommodate a flowing, heat-emitting fluid.

FIG. 18*c* shows a third example multilayer pipeline 1 having the same plies as the pipeline 1*b* shown in FIG. 18*b*. However, in the example pipeline 1*c*, the element 2 includes electric heating conductors 22. A variant of this example includes a combination of closed channels 20 and heating conductors 22.

Having described preferred examples of the invention it will be apparent to those skilled in the art that other embodiments incorporating the invention may be used. These and other examples of the invention illustrated above are intended by way of example only and the actual scope of the invention is to be determined from the appended claims.

What is claimed is:

1. A connector for connecting composite pipelines comprising:
    a flange unit including:
        a connector flange;
        an elongate tubular member extending from the connector flange, the elongate tubular member comprising at least two locking apertures;
        at least two locking studs; and
        a second tubular part configured to surround the elongate tubular member;
        wherein the second tubular part is configured to slide axially with respect to the elongate tubular member by a predetermined distance, to force the at least two locking studs into the at least two locking apertures, and radially inwards, to create a clamping force between the flange unit and a pipeline that the flange unit is to be installed upon;
        wherein the at least two locking studs comprises a series of several rows of locking bearings, and the at least two locking apertures comprises a series of several rows of locking apertures, wherein the series of locking bearings are configured to sit in the series of locking apertures, and the second tubular part is slidable over the series of locking bearings to force the series of locking bearings into the series of locking apertures, and radially inwards, to create the clamping force;
        wherein the series of locking bearings are spherical, and the series of locking apertures are circular and complementary to the series of locking bearings;
        wherein the series of locking bearings are progressively larger from a first end of the flange unit to a second end of the flange unit, the second end of the flange unit closer to the connector flange than the first end of the flange unit; and
        wherein the second tubular part comprises a first part and a second part, wherein the second part of the second tubular part is angled with respect to an external surface of the elongate member to accommodate the increasing size of the locking bearings when the flange unit is in a first unlocked position; and
    an outer pipe support tube; and
    an inner pipe support tube.

2. The connector of claim 1, further comprising an anti-vibration sleeve.

3. The connector of claim 1, further comprising an inner pipe element configured to sit within a well of the connector flange, the inner pipe element comprising an inner pipe seal and/or a leak detection area.

4. The connector of claim 1, further comprising an interface flange.

5. The connector of claim 1, further comprising a junction box.

6. The connector of claim 1, further comprising a leak detection monitoring sensor.

7. A kit of part comprising:
    a connector including:
        a flange unit including:
            a connector flange;
            an elongate tubular member extending from the connector flange, the elongate tubular member comprising at least two locking apertures;
            at least two locking studs; and
            a second tubular part configured to surround the elongate tubular member;
            wherein the second tubular part is configured to slide axially with respect to the elongate tubular member by a predetermined distance, to force the at least two locking studs into the at least two locking apertures, and radially inwards, to create a clamping force between the flange unit and a pipeline that the flange unit is to be installed upon;
        an outer pipe support tube; and
        an inner pipe support tube; and
    an installation apparatus including:
        an outer-pipe layer remover; and
        a flange unit attachment device.

8. The kit of part of claim 7, wherein the outer-pipe layer remover comprises a guide roller and a cutting tool.

9. The kit of part of claim 7, wherein the flange unit attachment device comprises a first clamp for clamping to the second tubular part and an outer-pipe clamp.

10. The kit of part of claim 7, wherein the flange unit attachment device further comprises one or both of an inner-pipe cutting tool and an inner-pipe coning tool.

11. A flange unit for use in connecting composite pipelines comprising:
    a connector flange;
    an elongate tubular member extending from the connector flange, the elongate tubular member comprising at least two locking apertures and a cable aperture for feeding through an exposed cable portion of a pipeline to be connected;

at least two locking studs; and a second tubular part configured to surround the elongate tubular member;

wherein the second tubular part is configured to slide axially with respect to the elongate tubular member by a predetermined distance, to force the at least two locking studs into the at least two locking apertures, and radially inwards, to create a clamping force between the flange unit and a pipeline that the flange unit is to be installed upon, wherein the at least two locking studs comprises a series of several rows of locking bearings, and the at least two locking apertures comprises a series of several rows of locking apertures, wherein the series of locking bearings are configured to sit in the series of locking apertures, and the second tubular part is slidable over the series of locking bearings to force the series of locking bearings into the series of locking apertures, and radially inwards, to create the clamping force;

wherein the series of locking bearings are spherical, and the series of locking apertures are circular and complementary to the series of locking bearings;

wherein the series of locking bearings are progressively larger from a first end of the flange unit to a second end of the flange unit, the second end of the flange unit closer to the connector flange than the first end of the flange unit; and wherein the second tubular part comprises a first part and a second part, wherein the second part of the second tubular part is angled with respect to an external surface of the elongate member to accommodate the increasing size of the locking bearings when the flange unit is in a first unlocked position.

12. A flange unit for use in connecting composite pipelines comprising:

a connector flange;

an elongate tubular member extending from the connector flange, the elongate tubular member comprising at least two locking apertures, a tapered section proximate to the connector flange and a non-tapered section, wherein the tapered section is configured to contiguously surround an inner part of a composite pipe, and the non-tapered section is configured to contiguously surround an outer part of the composite pipe;

at least two locking studs; and a second tubular part configured to surround the elongate tubular member;

wherein the second tubular part is configured to slide axially with respect to the elongate tubular member by a predetermined distance, to force the at least two locking studs into the at least two locking apertures, and radially inwards, to create a clamping force between the flange unit and a pipeline that the flange unit is to be installed upon, wherein the at least two locking studs comprises a series of several rows of locking bearings, and the at least two locking apertures comprises a series of several rows of locking apertures, wherein the series of locking bearings are configured to sit in the series of locking apertures, and the second tubular part is slidable over the series of locking bearings to force the series of locking bearings into the series of locking apertures, and radially inwards, to create the clamping force;

wherein the series of locking bearings are spherical, and the series of locking apertures are circular and complementary to the series of locking bearings;

wherein the series of locking bearings are progressively larger from a first end of the flange unit to a second end of the flange unit, the second end of the flange unit closer to the connector flange than the first end of the flange unit; and wherein the second tubular part comprises a first part and a second part, wherein the second part of the second tubular part is angled with respect to an external surface of the elongate member to accommodate the increasing size of the locking bearings when the flange unit is in a first unlocked position.

13. A flange unit for use in connecting composite pipelines comprising:

a connector flange including at least one bolt aperture for accommodating a bolt to connect the connector flange to an interface flange;

an elongate tubular member extending from the connector flange, the elongate tubular member comprising at least two locking apertures;

at least two locking studs; and a second tubular part configured to surround the elongate tubular member;

wherein the second tubular part is configured to slide axially with respect to the elongate tubular member by a predetermined distance, to force the at least two locking studs into the at least two locking apertures, and radially inwards, to create a clamping force between the flange unit and a pipeline that the flange unit is to be installed upon, wherein the at least two locking studs comprises a series of several rows of locking bearings, and the at least two locking apertures comprises a series of several rows of locking apertures, wherein the series of locking bearings are configured to sit in the series of locking apertures, and the second tubular part is slidable over the series of locking bearings to force the series of locking bearings into the series of locking apertures, and radially inwards, to create the clamping force;

wherein the series of locking bearings are spherical, and the series of locking apertures are circular and complementary to the series of locking bearings;

wherein the series of locking bearings are progressively larger from a first end of the flange unit to a second end of the flange unit, the second end of the flange unit closer to the connector flange than the first end of the flange unit; and wherein the second tubular part comprises a first part and a second part, wherein the second part of the second tubular part is angled with respect to an external surface of the elongate member to accommodate the increasing size of the locking bearings when the flange unit is in a first unlocked position.

* * * * *